United States Patent
Tanaka

(10) Patent No.: US 12,322,804 B2
(45) Date of Patent: Jun. 3, 2025

(54) SLURRY FOR NON-AQUEOUS SECONDARY BATTERY, SEPARATOR FOR NON-AQUEOUS SECONDARY BATTERY, ELECTRODE FOR NON-AQUEOUS SECONDARY BATTERY, LAMINATE FOR NON-AQUEOUS SECONDARY BATTERY, AND NON-AQUEOUS SECONDARY BATTERY

(71) Applicant: ZEON CORPORATION, Tokyo (JP)

(72) Inventor: Keiichiro Tanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 378 days.

(21) Appl. No.: 17/054,166

(22) PCT Filed: May 13, 2019

(86) PCT No.: PCT/JP2019/018925
§ 371 (c)(1),
(2) Date: Nov. 10, 2020

(87) PCT Pub. No.: WO2019/221056
PCT Pub. Date: Nov. 21, 2019

(65) Prior Publication Data
US 2021/0313580 A1    Oct. 7, 2021

(30) Foreign Application Priority Data
May 17, 2018    (JP) .................................. 2018-095479

(51) Int. Cl.
*H01M 4/62*    (2006.01)
*H01M 50/409*    (2021.01)
(Continued)

(52) U.S. Cl.
CPC .......... *H01M 4/622* (2013.01); *H01M 50/409* (2021.01); *H01M 50/443* (2021.01); *H01M 50/461* (2021.01)

(58) Field of Classification Search
CPC .................................................... H01M 50/461
See application file for complete search history.

(56) References Cited

U.S. PATENT DOCUMENTS

2010/0297489 A1* 11/2010 Beard ................. H01M 10/058
524/544
2013/0330622 A1    12/2013 Sasaki
(Continued)

FOREIGN PATENT DOCUMENTS

| CN | 105273444 A | 1/2016 |
|---|---|---|
| EP | 3674372 A1 | 7/2020 |

(Continued)

OTHER PUBLICATIONS

Nov. 17, 2020, International Preliminary Report on Patentability issued in the International Patent Application No. PCT/JP2019/018925.

(Continued)

*Primary Examiner* — Stephan J Essex
(74) *Attorney, Agent, or Firm* — KENJA IP LAW PC

(57) ABSTRACT

Provided is a slurry for a non-aqueous secondary battery with which an adhesive material can be efficiently provided at a surface of a battery member by an inkjet method or the like and that enables strong adhesion of the battery member to another battery member. The slurry contains a particulate polymer, a polyhydric alcohol compound, and water. The
(Continued)

particulate polymer has a core-shell structure including a core portion and a shell portion at least partially covering an outer surface of the core portion. The slurry contains not less than 10 parts by mass and not more than 400 parts by mass of the polyhydric alcohol compound per 100 parts by mass of the particulate polymer.

11 Claims, 3 Drawing Sheets

(51) Int. Cl.
  *H01M 50/443* (2021.01)
  *H01M 50/46* (2021.01)

(56) References Cited

U.S. PATENT DOCUMENTS

| | | | | |
|---|---|---|---|---|
| 2014/0227603 A1* | 8/2014 | Ogata | ............... | H01M 50/461 |
| | | | | 429/246 |
| 2015/0188108 A1* | 7/2015 | Miyazawa | ......... | H01M 50/443 |
| | | | | 156/60 |
| 2016/0141581 A1 | 5/2016 | Sasaki et al. | | |
| 2017/0117521 A1 | 4/2017 | Sasaki | | |
| 2017/0263907 A1 | 9/2017 | Ameyama et al. | | |
| 2020/0006733 A1* | 1/2020 | Cho | ................... | H01M 50/489 |

FOREIGN PATENT DOCUMENTS

| | | | |
|---|---|---|---|
| JP | 2012204303 | A | 10/2012 |
| JP | 2013145763 | A | 7/2013 |
| JP | 2015138770 | A | 7/2015 |
| JP | 2016025093 | A | 2/2016 |
| KR | 1020160012083 | A | 2/2016 |
| WO | 2012115096 | A1 | 8/2012 |
| WO | 2015005145 | A1 | 1/2015 |
| WO | 2015198530 | A1 | 12/2015 |
| WO | 2016047165 | A1 | 3/2016 |

OTHER PUBLICATIONS

Aug. 13, 2019, International Search Report issued in the International Patent Application No. PCT/JP2019/018925.

Feb. 14, 2022, the Extended European Search Report issued by the European Patent Office in the corresponding European Patent Application No. 19803173.4.

* cited by examiner

SLURRY FOR NON-AQUEOUS SECONDARY BATTERY, SEPARATOR FOR NON-AQUEOUS SECONDARY BATTERY, ELECTRODE FOR NON-AQUEOUS SECONDARY BATTERY, LAMINATE FOR NON-AQUEOUS SECONDARY BATTERY, AND NON-AQUEOUS SECONDARY BATTERY

TECHNICAL FIELD

The present disclosure relates to a slurry for a non-aqueous secondary battery, a separator for a non-aqueous secondary battery, an electrode for a non-aqueous secondary battery, a laminate for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery generally includes battery members such as a positive electrode, a negative electrode, and a separator that isolates the positive electrode and the negative electrode from each other and prevents short circuiting between the positive and negative electrodes.

In production of a secondary battery such as described above, affixing battery members of the secondary battery, such as an electrode and a separator, to obtain a laminate for a secondary battery is a conventionally used technique. Battery members are adhered by, for example, producing a battery member that includes an adhesive material at the surface thereof and then affixing this battery member to another battery member. A battery member that includes an adhesive material at the surface thereof can be produced by applying, onto a surface of the battery member, a slurry for a secondary battery containing an adhesive polymer (binder) and so forth that are dispersed and/or dissolved in a solvent, and subsequently drying the slurry for a secondary battery.

For example, in Patent Literature (PTL) 1, organic particles having a core-shell structure including a core portion and a shell portion that are formed of polymers each having a specific degree of swelling in electrolyte solution are used as a binder. In PTL 1, a battery member including an adhesive layer is produced through application and drying of a slurry that contains these organic particles, and then the battery member that includes the adhesive layer is affixed to another battery member to produce a laminate for a secondary battery. The obtained laminate for a secondary battery is sealed in a battery container with an electrolyte solution to produce a secondary battery.

CITATION LIST

Patent Literature

PTL 1: WO2015/198530A1

SUMMARY

Technical Problem

The inventor focused on techniques whereby a slurry for a secondary battery is supplied to a battery member surface by discharging the slurry for a secondary battery from a nozzle as fine droplets (inkjet method, spraying method, etc.; hereinafter, these supply techniques are also referred to as an "inkjet method or the like") with the aim of strongly adhering battery members to each other while also causing a secondary battery to display excellent battery characteristics (particularly low-temperature output characteristics) and increasing secondary battery production efficiency. The inventor attempted to produce a battery member including an adhesive material by supplying a slurry for a secondary battery containing the organic particles described in PTL 1 to a battery member surface by an inkjet method or the like and then drying the slurry for a secondary battery on the battery member surface. However, studies conducted by the inventor have revealed that when a slurry for a secondary battery containing the organic particles described in PTL 1 is supplied to a battery member surface by an inkjet method or the like, nozzle clogging may occur, and production efficiency of a battery member, and also of a secondary battery, may decrease.

In other words, the conventional technique described above still leaves room for improvement in terms of ensuring strong adhesion of battery members and excellent low-temperature output characteristics of a secondary battery, while also efficiently providing an adhesive material at a battery member surface even in a situation in which an inkjet method or the like is adopted.

Accordingly, one object of the present disclosure is to provide a slurry for a non-aqueous secondary battery with which an adhesive material can be efficiently provided at a surface of a battery member by an inkjet method or the like and that enables strong adhesion of the battery member to another battery member.

Another object of the present disclosure is to provide a separator for a non-aqueous secondary battery and an electrode for a non-aqueous secondary battery that can strongly adhere to another battery member adjacent thereto and that can cause a secondary battery to display excellent low-temperature output characteristics.

Another object of the present disclosure is to provide a laminate for a non-aqueous secondary battery in which an electrode and a separator are strongly adhered and that can cause a secondary battery to display excellent low-temperature output characteristics.

Another object of the present disclosure is to provide a non-aqueous secondary battery having excellent low-temperature output characteristics.

Solution to Problem

The inventor conducted diligent investigation with the aim of solving the problems set forth above. The inventor discovered that by using a slurry that contains a particulate polymer having a specific core-shell structure, a polyhydric alcohol compound, and water and in which the content ratio of the polyhydric alcohol compound relative to the particulate polymer is within a specific range, a battery member surface can be efficiently provided with an adhesive material that can strongly adhere battery members even in a situation in which an inkjet method or the like is adopted, and a secondary battery can be caused to display excellent low-temperature output characteristics. In this manner, the inventor completed the present disclosure.

Specifically, the present disclosure aims to advantageously solve the problems set forth above, and a presently disclosed slurry for a non-aqueous secondary battery comprises a particulate polymer, a polyhydric alcohol compound, and water, wherein the particulate polymer has a core-shell structure including a core portion and a shell portion at least partially covering an outer surface of the core portion, and not less than 10 parts by mass and not more than 400 parts by mass of the polyhydric alcohol compound is contained per 100 parts by mass of the particulate polymer. Through a slurry for a secondary battery that contains a particulate polymer having a specific core-shell structure, a polyhydric alcohol compound, and water and in which the content ratio of the polyhydric alcohol compound relative to the particulate polymer is within a specific range in this manner, it is possible to inhibit nozzle clogging while also ensuring drying efficiency of the slurry and efficiently providing an adhesive material at a battery member surface even in a situation in which the slurry is supplied to the battery member surface by an inkjet method or the like. Moreover, by providing an adhesive material at a battery member surface using the slurry for a secondary battery set forth above, battery members can be strongly adhered via the adhesive material.

In the presently disclosed slurry for a non-aqueous secondary battery, it is preferable that a polymer of the core portion has a glass-transition temperature of not lower than 10° C. and not higher than 200° C., and a polymer of the shell portion has a glass-transition temperature that is at least 10° C. lower than the glass-transition temperature of the polymer of the core portion. In the case of a particulate polymer in which a polymer of a core portion has a glass-transition temperature of not lower than 10° C. and not higher than 200° C. and in which a polymer of a shell portion has a glass-transition temperature that is at least 10° C. lower than the glass-transition temperature of the polymer of the core portion, polymerization stability is ensured, and battery members can be more strongly adhered via an adhesive material by using a slurry for a secondary battery that contains the particulate polymer.

Note that the "glass-transition temperature" referred to in the present disclosure can be measured by a measurement method described in the EXAMPLES section of the present specification.

In the presently disclosed slurry for a non-aqueous secondary battery, the particulate polymer preferably has a proportion of THF-insoluble content of 80 mass % or more. By using a slurry for a secondary battery containing a particulate polymer that has a proportion of THF (tetrahydrofuran) insoluble content of 80 mass % or more, a secondary battery can be caused to display even better low-temperature output characteristics.

Note that the "proportion of THF-insoluble content" referred to in the present disclosure can be measured by a measurement method described in the EXAMPLES section of the present specification.

In the presently disclosed slurry for a non-aqueous secondary battery, the particulate polymer preferably has a volume-average particle diameter of not less than 100 nm and not more than 1,000 nm. By using a slurry for a secondary battery containing a particulate polymer having a volume-average particle diameter of not less than 100 nm and not more than 1,000 nm, nozzle clogging can be further inhibited in a situation in which an inkjet method or the like is adopted, and an adhesive material can be more efficiently provided at a battery member surface. Moreover, battery members can be more strongly adhered via the adhesive material.

Note that the "volume-average particle diameter" referred to in the present disclosure represents the particle diameter at which cumulative volume calculated from a small diameter end of a volume-basis particle diameter distribution measured by laser diffraction reaches 50% and can be measured by a measurement method described in the EXAMPLES section of the present specification.

In the presently disclosed slurry for a non-aqueous secondary battery, an amount of coarse particles having a diameter of 10 μm or more is preferably 100 ppm or less. By using a slurry for a secondary battery in which the amount of coarse particles having a diameter of 10 μm or more is 100 ppm or less, battery members can be more strongly adhered via an adhesive material.

Note that the "amount of coarse particles" referred to in the present disclosure can be measured by a measurement method described in the EXAMPLES section of the present specification.

Moreover, the present disclosure aims to advantageously solve the problems set forth above, and a presently disclosed separator for a non-aqueous secondary battery comprises: a separator substrate; and an adhesive material provided in plurality in a dotted form on at least one surface of the separator substrate, wherein the adhesive material is a dried product of any one of the slurries for a non-aqueous secondary battery set forth above. A separator that includes, at a surface thereof, an adhesive material that is disposed in plurality in a dotted form and that is obtained by drying any one of the slurries for a non-aqueous secondary battery set forth above can strongly adhere to another adjacent battery member (for example, an electrode) via the adhesive material and can cause a secondary battery to display excellent low-temperature output characteristics.

Furthermore, the present disclosure aims to advantageously solve the problems set forth above, and a presently disclosed electrode for a non-aqueous secondary battery comprises: an electrode substrate; and an adhesive material provided in plurality in a dotted form on at least one surface of the electrode substrate, wherein the adhesive material is a dried product of any one of the slurries for a non-aqueous secondary battery set forth above. An electrode that includes, at a surface thereof, an adhesive material that is provided in plurality in a dotted form and that is obtained by drying any one of the slurries for a non-aqueous secondary battery set forth above can strongly adhere to another adjacent battery member (for example, a separator) via the adhesive material and can cause a secondary battery to display excellent low-temperature output characteristics.

Also, the present disclosure aims to advantageously solve the problems set forth above, and a presently disclosed laminate for a non-aqueous secondary battery comprises an electrode and a separator, wherein the electrode and the separator are adhered via an adhesive material provided in plurality in a dotted form, and the adhesive material is a dried product of any one of the slurries for a non-aqueous secondary battery set forth above. A laminate for a secondary battery in which an electrode and a separator are adhered by an adhesive material that is provided in plurality in a dotted form and that is obtained through drying of any one of the slurries for a non-aqueous secondary battery set forth above has strong adhesion between the electrode and the separator and can cause a secondary battery to display excellent low-temperature output characteristics.

Moreover, the present disclosure aims to advantageously solve the problems set forth above, and a presently disclosed non-aqueous secondary battery comprises at least one selected from the group consisting of the separator for a non-aqueous secondary battery set forth above, the electrode for a non-aqueous secondary battery set forth above, and the laminate for a non-aqueous secondary battery set forth above. A secondary battery that includes at least one of the separator, electrode, and laminate for a secondary battery set forth above has excellent low-temperature output characteristics.

Advantageous Effect

According to the present disclosure, it is possible to provide a slurry for a non-aqueous secondary battery with which an adhesive material can be efficiently provided at a surface of a battery member by an inkjet method or the like and that enables strong adhesion of the battery member to another battery member.

Moreover, according to the present disclosure, it is possible to provide a separator for a non-aqueous secondary battery and an electrode for a non-aqueous secondary battery that can strongly adhere to another battery member adjacent thereto and that can cause a secondary battery to display excellent low-temperature output characteristics.

Furthermore, according to the present disclosure, it is possible to provide a laminate for a non-aqueous secondary battery in which an electrode and a separator are strongly adhered and that can cause a secondary battery to display excellent low-temperature output characteristics.

Also, according to the present disclosure, it is possible to provide a non-aqueous secondary battery having excellent low-temperature output characteristics.

DETAILED DESCRIPTION

Figure 1:
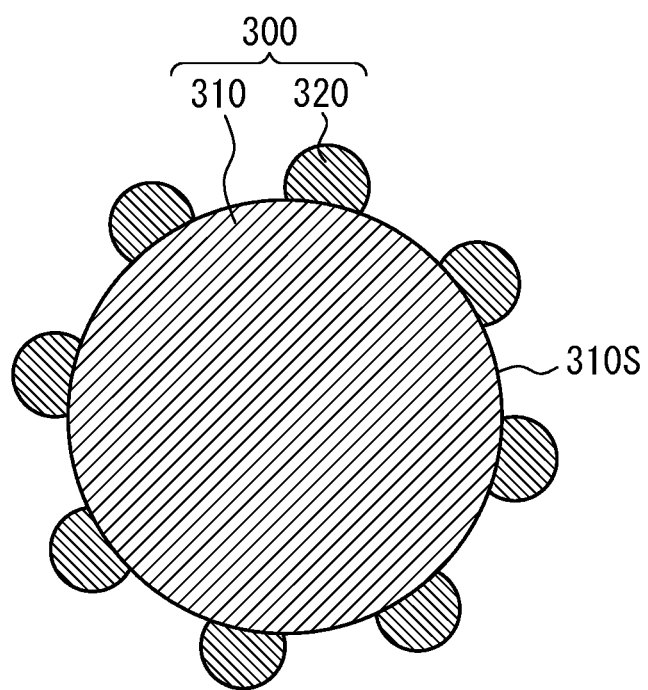
FIG. 1 is a cross-sectional view schematically illustrating the structure of one example of a particulate polymer contained in a slurry for a non-aqueous secondary battery.

The following provides a detailed description of embodiments of the present disclosure.

The presently disclosed slurry for a non-aqueous secondary battery can be used to arrange (form) an adhesive material for adhering battery members at a battery member surface and, more specifically, can be used in production of the presently disclosed separator for a non-aqueous secondary battery, the presently disclosed electrode for a non-aqueous secondary battery, and/or the presently disclosed laminate for a non-aqueous secondary battery. The presently disclosed non-aqueous secondary battery includes at least one selected from the group consisting of the presently disclosed separator for a non-aqueous secondary battery, the presently disclosed electrode for a non-aqueous secondary battery, and the presently disclosed laminate for a non-aqueous secondary battery.

(Slurry for Non-Aqueous Secondary Battery)

The presently disclosed slurry for a secondary battery is a composition that contains a particulate polymer having a specific core-shell structure, a polyhydric alcohol compound, and water, and in which the content of the polyhydric alcohol compound is not less than 10 parts by mass and not more than 400 parts by mass per 100 parts by mass of the particulate polymer. Note that the presently disclosed slurry for a secondary battery may contain components other than the particulate polymer having a core-shell structure, the polyhydric alcohol compound, and water (i.e., other components).

The presently disclosed slurry for a secondary battery does not tend to result in nozzle clogging even when it is supplied to a battery member surface by an inkjet method or the like and has excellent drying efficiency once it has been supplied to a battery member surface. In other words, an adhesive material can be efficiently provided at a battery member surface using the presently disclosed slurry for a secondary battery. Moreover, by providing an adhesive material at a battery member surface using the presently disclosed slurry for a secondary battery, battery members can be strongly adhered via the adhesive material.

<Particulate Polymer>

The particulate polymer having a core-shell structure is a component that functions as a binder in an adhesive material that adheres battery members such as a separator and an electrode. By using a particulate polymer that has a core-shell structure as a binder, battery members can be strongly adhered via the adhesive material, electrolyte solution injectability of a secondary battery can be increased, and the secondary battery can be caused to display excellent low-temperature output characteristics.

<<Core-Shell Structure>>

The particulate polymer has a core-shell structure including a core portion and a shell portion at least partially covering an outer surface of the core portion. The shell portion may completely cover the outer surface of the core portion or may partially cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, a particulate polymer that includes a shell portion having fine pores that pass between an outer surface of the shell portion (i.e., a circumferential surface of the particulate polymer) and an outer surface of a core portion, for example, also corresponds to a particulate polymer in which a shell portion partially covers the outer surface of a core portion.

FIG. 1 illustrates cross-sectional structure of one example of the particulate polymer. A particulate polymer 300 illustrated in FIG. 1 has a core-shell structure including a core portion 310 and a shell portion 320. The core portion 310 is a portion that is further inward than the shell portion 320 in the particulate polymer 300. The shell portion 320 is a portion that covers an outer surface 310S of the core portion 310 and is normally an outermost portion in the particulate polymer 300. In the example illustrated in FIG. 1, the shell portion 320 partially covers the outer surface 310S of the core portion 310 rather than completely covering the outer surface 310S of the core portion 310.

Note that the particulate polymer may include any constituent element other than the core portion and the shell portion described above so long as the expected effects are not significantly lost as a result. Specifically, the particulate polymer may, for example, include a portion inside of the core portion that is formed of a different polymer to the core portion. In one specific example, a residual seed particle may be present inside of the core portion in a situation in which seed particles are used in production of the particulate polymer by seeded polymerization. However, from a viewpoint of more noticeably displaying the expected effects, it is preferable that the particulate polymer is composed of only the core portion and the shell portion.

<<Core Portion>>

[Glass-Transition Temperature]

The glass-transition temperature of a polymer of the core portion of the particulate polymer is preferably 10° C. or higher, more preferably 40° C. or higher, even more preferably 52° C. or higher, and particularly preferably 60° C. or higher, and is preferably 200° C. or lower, more preferably 150° C. or lower, even more preferably 110° C. or lower, and particularly preferably 95° C. or lower. When the glass-transition temperature of the polymer of the core portion is 10° C. or higher, battery members can be more strongly adhered via the adhesive material. On the other hand, when the glass-transition temperature of the polymer of the core portion is 200° C. or lower, polymerization stability of the particulate polymer can be ensured.

Note that the glass-transition temperature of the polymer of the core portion can be adjusted by, for example, altering the types and proportions of monomers used to produce the polymer of the core portion.

[Composition]

Examples of monomers that can be used to produce the polymer of the core portion include vinyl chloride monomers such as vinyl chloride and vinylidene chloride; vinyl acetate monomers such as vinyl acetate; aromatic vinyl monomers such as styrene, α-methylstyrene, styrene sulfonic acid, butoxystyrene, and vinylnaphthalene; vinylamine monomers such as vinylamine; vinylamide monomers such as N-vinylformamide and N-vinylacetamide; (meth)acrylic acid ester monomers such as methyl acrylate, ethyl acrylate, butyl acrylate, 2-ethylhexyl acrylate, methyl methacrylate, ethyl methacrylate, butyl methacrylate, and cyclohexyl methacrylate; (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate and 2-(perfluorobutyl)ethyl acrylate; maleimide; and maleimide derivatives such as phenylmaleimide. One of these monomers may be used individually, or two or more of these monomers may be used in combination in a freely selected ratio.

Note that in the present disclosure, "(meth)acryl" is used to indicate "acryl" and/or "methacryl", whereas "(meth)acrylonitrile" is used to indicate "acrylonitrile" and/or "methacrylonitrile".

Of these monomers, it is preferable that at least one of an aromatic vinyl monomer and a (meth)acrylic acid ester monomer, and more preferable that both an aromatic vinyl monomer and a (meth)acrylic acid ester monomer are used as monomers in production of the polymer of the core portion from a viewpoint of more strongly adhering battery members via the adhesive material. In other words, the polymer of the core portion preferably includes either or both of an aromatic vinyl monomer unit and a (meth)acrylic acid ester monomer unit, and more preferably includes both an aromatic vinyl monomer unit and a (meth)acrylic acid ester monomer unit.

The phrase "includes a monomer unit" as used in the present disclosure means that "a polymer obtained with the monomer includes a repeating unit derived from the monomer".

The proportion constituted by an aromatic vinyl monomer unit in the polymer of the core portion when all repeating units (all monomer units) included in the polymer of the core portion are taken to be 100 mass % is, from a viewpoint of even more strongly adhering battery members via the adhesive material, preferably 50 mass % or more, more preferably 60 mass % or more, even more preferably 70 mass % or more, and particularly preferably 75 mass % or more, and is preferably 95 mass % or less, more preferably 90 mass % or less, and even more preferably 88 mass % or less.

Moreover, the proportion constituted by a (meth)acrylic acid ester monomer unit in the polymer of the core portion when all repeating units (all monomer units) included in the polymer of the core portion are taken to be 100 mass % is, from a viewpoint of even more strongly adhering battery members via the adhesive material, preferably 2 mass % or more, more preferably 3 mass % or more, even more preferably 4 mass % or more, and particularly preferably 6 mass % or more, and is preferably 24 mass % or less, more preferably 20 mass % or less, even more preferably 15 mass % or less, and particularly preferably 10 mass % or less.

The polymer of the core portion may include an acid group-containing monomer unit. Examples of acid group-containing monomers include monomers having an acid group such as carboxy group-containing monomers, sulfo group-containing monomers, and phosphate group-containing monomers.

Examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", whereas "(meth)acryloyl" is used to indicate "acryloyl" and/or "methacryloyl".

Of these acid group-containing monomers, carboxy group-containing monomers are preferable, of which, monocarboxylic acids are preferable, and (meth)acrylic acid is more preferable.

One acid group-containing monomer may be used individually, or two or more acid group-containing monomers may be used in combination in a freely selected ratio.

The proportion constituted by an acid group-containing monomer unit in the polymer of the core portion when all repeating units (all monomer units) included in the polymer of the core portion are taken to be 100 mass % is preferably 0.1 mass % or more, and more preferably 1 mass % or more, and is preferably 15 mass % or less, and more preferably 10 mass % or less. By setting the proportion constituted by an acid group-containing monomer unit within any one of the ranges set forth above, it is possible to increase dispersibility of the polymer of the core portion during production of the particulate polymer and to facilitate formation of a shell portion on the outer surface of the polymer of the core portion that partially covers the outer surface of the core portion.

The polymer of the core portion may include a hydroxy group-containing monomer unit.

Examples of hydroxy group-containing monomers that can form a hydroxy group-containing monomer unit include 2-hydroxyethyl acrylate, 2-hydroxypropyl acrylate, 2-hydroxyethyl methacrylate, and 2-hydroxypropyl methacrylate. One of these hydroxy group-containing monomers may be used individually, or two or more of these hydroxy group-containing monomers may be used in combination in a freely selected ratio.

The proportion constituted by a hydroxy group-containing monomer unit in the polymer of the core portion when all repeating units (all monomer units) included in the polymer of the core portion are taken to be 100 mass % is preferably 0.1 mass % or more, and more preferably 1 mass % or more, and is preferably 15 mass % or less, and more preferably 10 mass % or less. By setting the proportion constituted by a hydroxy group-containing monomer unit within any one of the ranges set forth above, it is possible to increase dispersibility of the polymer of the core portion during production of the particulate polymer and to facilitate formation of a shell portion on the outer surface of the polymer of the core portion that partially covers the outer surface of the core portion.

The polymer of the core portion preferably includes a cross-linkable monomer unit in addition to the monomer units described above. A cross-linkable monomer is a monomer that can form a cross-linked structure during or after polymerization by heating or by irradiation with energy rays. The inclusion of a cross-linkable monomer unit in the polymer of the core portion makes it easy to set the subsequently described proportion of THF-insoluble content and degree of swelling in electrolyte solution of the particulate polymer within suitable ranges.

Examples of cross-linkable monomers that can be used include polyfunctional monomers having at least two groups that display polymerization reactivity in the monomer. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth)acrylic acid ester monomers such as trimethylolpropane trimethacrylate and trimethylolpropane triacrylate; ethylenically unsaturated monomers that include an epoxy group such as allyl glycidyl ether and glycidyl methacrylate; and γ-methacryloxypropyltrimethoxysilane. Of these cross-linkable monomers, di(meth)acrylic acid ester monomers are more preferable from a viewpoint of easily controlling the proportion of THF-insoluble content and degree of swelling in electrolyte solution of the particulate polymer. One of these cross-linkable monomers may be used individually, or two or more of these cross-linkable monomers may be used in combination in a freely selected ratio.

The proportion constituted by a cross-linkable monomer unit in the polymer of the core portion when all repeating units (all monomer units) included in the polymer of the core portion are taken to be 100 mass % is preferably 0.1 mass % or more, more preferably 0.2 mass % or more, and even more preferably 0.5 mass % or more, and is preferably 10 mass % or less, more preferably 5 mass % or less, and even more preferably 3 mass % or less. By setting the proportion constituted by a cross-linkable monomer unit within any of the ranges set forth above, battery members can be even more strongly adhered via the adhesive material while also controlling the proportion of THF-insoluble content and degree of swelling in electrolyte solution of the particulate polymer and further improving low-temperature output characteristics of a secondary battery.

<<Shell Portion>>
[Glass-Transition Temperature]

The glass-transition temperature of the polymer of the shell portion of the particulate polymer is preferably −50° C. or higher, more preferably −45° C. or higher, even more preferably −40° C. or higher, and particularly preferably −34° C. or higher, and is preferably 60° C. or lower, more preferably 50° C. or lower, even more preferably 40° C. or lower, and particularly preferably 21° C. or lower. When the glass-transition temperature of the polymer of the shell portion is −50° C. or higher, low-temperature output characteristics of a secondary battery can be further improved. On the other hand, when the glass-transition temperature of the polymer of the shell portion is 60° C. or lower, battery members can be more strongly adhered via the adhesive material.

Note that the glass-transition temperature of the polymer of the shell portion can be adjusted by, for example, altering the types and proportions of monomers used to produce the polymer of the shell portion.

From a viewpoint of even more strongly adhering battery members via the adhesive material, the glass-transition temperature of the polymer of the shell portion is preferably at least 10° C. lower than the previously described glass-transition temperature of the polymer of the core portion, more preferably at least 30° C. lower than the glass-transition temperature of a polymer of the core portion, and even more preferably at least 50° C. lower than the glass-transition temperature of the polymer of the core portion. In other words, it is preferable that the glass-transition temperature of the polymer of the shell portion is lower than the glass-transition temperature of the polymer of the core portion and that the difference between these two glass-transition temperatures (glass-transition temperature of polymer of core portion—glass-transition temperature of polymer of shell portion) is 10° C. or more, more preferably 30° C. or more, and even more preferably 50° C. or more. Note that the upper limit for the difference between these two glass-transition temperatures is not specifically limited and can, for example, be set as 200° C. or less.

[Composition]

Examples of monomers that can be used to produce the polymer of the shell portion include the same monomers as given as examples of monomers that can be used to produce the polymer of the core portion. One of such monomers may be used individually, or two or more of such monomers may be used in combination in a freely selected ratio.

Of these monomers, it is preferable that at least one of a (meth)acrylic acid ester monomer and an aromatic vinyl monomer is used as a monomer in production of the polymer of the shell portion, and more preferable that both a (meth)acrylic acid ester monomer and an aromatic vinyl monomer are used as monomers in production of the polymer of the shell portion. In other words, the polymer of the shell portion preferably includes either or both of a (meth)acrylic acid ester monomer unit and an aromatic vinyl monomer unit, and more preferably includes both a (meth)acrylic acid ester monomer unit and an aromatic vinyl monomer unit.

The proportion constituted by a (meth)acrylic acid ester monomer unit in the polymer of the shell portion when all repeating units (all monomer units) included in the polymer of the shell portion are taken to be 100 mass % is, from a viewpoint of even more strongly adhering battery members via the adhesive material, preferably 10 mass % or more, more preferably 30 mass % or more, even more preferably 38.7 mass % or more, and particularly preferably 50 mass % or more, and is preferably 95 mass % or less, more preferably 90 mass % or less, even more preferably 85 mass % or less, and particularly preferably 80.7 mass % or less.

Moreover, the proportion constituted by an aromatic vinyl monomer unit in the polymer of the shell portion when all repeating units (all monomer units) included in the polymer of the shell portion are taken to be 100 mass % is, from a viewpoint of even more strongly adhering battery members via the adhesive material, preferably 5 mass % or more, preferably 10 mass % or more, even more preferably 15 mass % or more, and particularly preferably 18 mass % or more, and is preferably 60 mass % or less, more preferably 40 mass % or less, even more preferably 30 mass % or less, and particularly preferably 25 mass % or less.

Besides a (meth)acrylic acid ester monomer unit and an aromatic vinyl monomer unit, the polymer of the shell portion may include an acid group-containing monomer unit. Examples of acid group-containing monomers that can be used include monomers having an acid group such as carboxy group-containing monomers, sulfo group-containing monomers, and phosphate group-containing monomers. Specifically, examples of acid group-containing monomers that can be used include the same monomers as acid group-containing monomers that can be used in formation of the core portion.

Of these acid group-containing monomers, carboxy group-containing monomers are preferable, of which, monocarboxylic acids are more preferable, and (meth)acrylic acid is even more preferable.

One acid group-containing monomer may be used individually, or two or more acid group-containing monomers may be used in combination in a freely selected ratio.

The proportion constituted by an acid group-containing monomer unit in the polymer of the shell portion when all repeating units (all monomer units) included in the polymer of the shell portion are taken to be 100 mass % is preferably 0.1 mass % or more, more preferably 0.4 mass % or more, and even more preferably 0.7 mass % or more, and is preferably 15 mass % or less, more preferably 10 mass % or less, and even more preferably 5 mass % or less. By setting the proportion constituted by an acid group-containing monomer unit within any of the ranges set forth above, dispersibility of the particulate polymer can be improved, and battery members can be even more strongly adhered via the adhesive material.

The polymer of the shell portion may include a hydroxy group-containing monomer unit.

Examples of hydroxy group-containing monomers that can form a hydroxy group-containing monomer unit of the polymer of the shell portion include the same monomers as the hydroxy group-containing monomers that can be used in formation of the core portion.

The proportion constituted by a hydroxy group-containing monomer unit in the polymer of the shell portion when all repeating units (all monomer units) included in the polymer of the shell portion are taken to be 100 mass % is preferably 0.1 mass % or more, more preferably 0.4 mass % or more, and even more preferably 0.7 mass % or more, and is preferably 15 mass % or less, more preferably 10 mass % or less, and even more preferably 5 mass % or less. By setting the proportion constituted by a hydroxy group-containing monomer unit within any of the ranges set forth above, dispersibility of the particulate polymer can be improved, and battery members can be even more strongly adhered via the adhesive material.

The polymer of the shell portion may include a cross-linkable monomer unit. Examples of cross-linkable monomers that can be used include the same monomers as provided as examples of cross-linkable monomers that can be used for the polymer of the core portion. Of these cross-linkable monomers, di(meth)acrylic acid ester monomers and allyl methacrylate are preferable. One cross-linkable monomer may be used individually, or two or more cross-linkable monomers may be used in combination in a freely selected ratio.

The proportion constituted by a cross-linkable monomer unit in the polymer of the shell portion when all repeating units (all monomer units) included in the polymer of the shell portion are taken to be 100 mass % is preferably 0.05 mass % or more, more preferably 0.1 mass % or more, and even more preferably 0.2 mass % or more, and is preferably 4 mass % or less, more preferably 3 mass % or less, and even more preferably 2 mass % or less.

<<Properties of Particulate Polymer>>

The proportion of THF-insoluble content of the particulate polymer is preferably 80 mass % or more, more preferably 82 mass % or more, and even more preferably 85 mass % or more, and is preferably 99 mass % or less, more preferably 95 mass % or less, and even more preferably 90 mass % or less. When the proportion of THF-insoluble content of the particulate polymer is 80 mass % or more, low-temperature output characteristics of a secondary battery can be further improved. On the other hand, when the proportion of THF-insoluble content of the particulate polymer is 99 mass % or less, battery members can be even more strongly adhered via the adhesive material.

Note that the proportion of THF-insoluble content of the particulate polymer can be adjusted by, for example, altering the types and proportions of monomers used to produce the particulate polymer.

The volume-average particle diameter of the particulate polymer is preferably 100 nm or more, more preferably 150 nm or more, and even more preferably 180 nm or more, and is preferably 1,000 nm or less, more preferably 350 nm or less, and even more preferably 300 nm or less. When the volume-average particle diameter of the particulate polymer is 100 nm or more, battery members can be even more strongly adhered via the adhesive material. On the other hand, when the volume-average particle diameter of the particulate polymer is 1,000 nm or less, nozzle clogging can be further inhibited in a situation in which an inkjet method or the like is adopted, and the adhesive material can be more efficiently provided at a battery member surface.

Note that the volume-average particle diameter of the particulate polymer can be adjusted by, for example, altering the types and amounts of a polymerization initiator and an emulsifier used in production of the particulate polymer.

The degree of swelling in electrolyte solution of the particulate polymer is preferably a factor of 1.01 or more, more preferably a factor of 1.1 or more, and even more preferably a factor of 1.2 or more, and is preferably a factor of 20 or less, more preferably a factor of 15 or less, and even more preferably a factor of 10 or less. When the degree of swelling in electrolyte solution of the particulate polymer is a factor of 1.01 or more, battery members can be even more strongly adhered (particularly in electrolyte solution) via the adhesive material. On the other hand, when the degree of swelling in electrolyte solution of the particulate polymer is a factor of 20 or less, low-temperature output characteristics of a secondary battery can be further improved.

Note that the "degree of swelling in electrolyte solution" referred to in the present disclosure can be measured by a measurement method described in the EXAMPLES section of the present specification.

Also note that the degree of swelling in electrolyte solution of the particulate polymer can be adjusted by, for example, altering the types and proportions of monomers used to produce the particulate polymer.

<<Production Method of Particulate Polymer>>

The particulate polymer having the core-shell structure set forth above can be produced, for example, by stepwise polymerization in which the ratio of monomers for the polymer of the core portion and monomers for the polymer of the shell portion is changed over time. Specifically, the particulate polymer can be produced by continuous, multi-step emulsion polymerization or multi-step suspension polymerization in which a polymer of a preceding step is then covered by a polymer of a succeeding step.

The following describes one example of a case in which the particulate polymer having the core-shell structure described above is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl) propionamide) or 2,2'-azobis(2-amidinopropane) hydrochloride may be used as a polymerization initiator.

The polymerization procedure involves initially mixing monomers for forming the core portion and the emulsifier, and then performing emulsion polymerization as one batch to obtain a particulate polymer that forms the core portion. The particulate polymer having the core-shell structure set forth above can then be obtained by performing polymerization of monomers for forming the shell portion in the presence of the particulate polymer forming the core portion.

In this polymerization, it is preferable that the monomers for forming the polymer of the shell portion are supplied into the polymerization system continuously or divided into a plurality of portions in a case in which a particulate polymer in which the outer surface of a core portion is partially covered by a shell portion is to be produced. As a result of the monomers for forming the polymer of the shell portion being supplied into the polymerization system in portions or continuously, the polymer forming the shell portion can be formed as particles that bond to the core portion such as to form a shell portion that partially covers the core portion.

<Polyhydric Alcohol Compound>

The polyhydric alcohol compound is a compound that includes at least two hydroxy groups (—OH) in a single molecule. As a result of the presently disclosed slurry for a secondary battery containing the polyhydric alcohol compound, it is possible to inhibit nozzle clogging even in a situation in which the slurry is supplied to a battery member surface by an inkjet method or the like and to efficiently provide an adhesive material at the battery member surface. Although it is not clear why nozzle clogging can be inhibited when the slurry for a secondary battery is supplied by an inkjet method or the like as a result of the slurry for a secondary battery containing the polyhydric alcohol compound, it is thought that the polyhydric alcohol compound having a plurality of hydroxy groups in a single molecule functions as a humectant to thereby inhibit evaporation of water in the slurry for a secondary battery inside a nozzle (particularly evaporation of water inside the nozzle during standing time while supply is temporarily suspended), and, as a result, precipitation of a binder such as the particulate polymer can be inhibited.

The polyhydric alcohol compound may, for example, be propylene glycol, ethylene glycol, glycerin, 1,3-propanediol, 1,4-butanediol, glucose, fructose, cellulose, or the like. One of these polyhydric alcohol compounds may be used individually, or two or more of these polyhydric alcohol compounds may be used in combination in a freely selected ratio. Of these polyhydric alcohol compounds, propylene glycol, ethylene glycol, glycerin, 1,3-propanediol, and 1,4-butanediol are preferable from a viewpoint of further inhibiting nozzle clogging during supply of the slurry for a secondary battery by an inkjet method or the like and more efficiently providing an adhesive material at a battery member surface, with propylene glycol, ethylene glycol, and glycerin being more preferable.

The presently disclosed slurry for a secondary battery is required to contain not less than 10 parts by mass and not more than 400 parts by mass of the polyhydric alcohol compound per 100 parts by mass of the particulate polymer having the previously described core-shell structure, preferably contains 20 parts by mass or more, more preferably 30 parts by mass or more, and even more preferably 70 parts by mass or more of the polyhydric alcohol compound per 100 parts by mass of the particulate polymer, and preferably contains 300 parts by mass or less, more preferably 250 parts by mass or less, and even more preferably 200 parts by mass or less of the polyhydric alcohol compound per 100 parts by mass of the particulate polymer. When the content of the polyhydric alcohol compound is less than 10 parts by mass per 100 parts by mass of the particulate polymer, nozzle clogging cannot be inhibited during supply of the slurry for a secondary battery by an inkjet method or the like. In addition, electrolyte solution injectability of a secondary battery decreases when the content of the polyhydric alcohol compound is less than 10 parts by mass per 100 parts by mass of the particulate polymer. This is presumed to be due to less of the polyhydric alcohol compound, which has excellent affinity with electrolyte solution, remaining at the surface of an adhesive material (dried product) formed from the slurry for a secondary battery. On the other hand, when the content of the polyhydric alcohol compound is more than 400 parts by mass per 100 parts by mass of the particulate polymer, the polyhydric alcohol compound contributes to excessively lowering the tendency of water contained in the slurry for a secondary battery to evaporate, and thereby reduces drying efficiency of the slurry for a secondary battery. In addition, detachment of the adhesive material (particularly the particulate polymer) from an obtained battery member cannot be sufficiently inhibited (i.e., dusting resistance of the adhesive material decreases) when the content of the polyhydric alcohol compound is more than 400 parts by mass per 100 parts by mass of the particulate polymer. This is presumed to be due to more of the polyhydric alcohol compound remaining in the adhesive material without evaporating through drying.

The presently disclosed slurry for a secondary battery preferably contains 1 part by mass or more, more preferably 2 parts by mass or more, and even more preferably 3 parts by mass or more of the polyhydric alcohol compound per 100 parts by mass of water, and preferably contains 80 parts by mass or less, more preferably 50 parts by mass or less, and even more preferably 29 parts by mass or less of the polyhydric alcohol compound per 100 parts by mass of water. Nozzle clogging can be further inhibited during supply of the slurry for a secondary battery by an inkjet method or the like when the content of the polyhydric alcohol compound is 1 part by mass or more per 100 parts by mass of water, whereas the tendency of water contained in the slurry for a secondary battery to evaporate does not excessively decrease and sufficient drying efficiency of the slurry for a secondary battery can be ensured when the content of the polyhydric alcohol compound is 80 parts by mass or less per 100 parts by mass of water.

<Other Components>

No specific limitations are placed on components other than the previously described particulate polymer having a core-shell structure, polyhydric alcohol compound, and water that can be contained in the presently disclosed slurry for a secondary battery. Examples of such components include known additives and binders other than the previously described particulate polymer having a core-shell structure (i.e., other binders).

<<Additives>>

Examples of known additives that may be contained in the slurry include, but are not specifically limited to, components such as surface tension modifiers, dispersants, viscosity modifiers, reinforcing materials, and additives for electrolyte solution. These additives are not specifically limited so long as they do not affect battery reactions and may be selected from commonly known components such as those described in WO2012/115096A1. Note that one of these additives may be used individually, or two or more of these additives may be used in combination in a freely selected ratio.

<<Other Binders>>

No specific limitations are placed on other binders that can be used other than not being a particulate polymer having a core-shell structure, and examples thereof include fluoropolymers such as polyvinylidene fluoride (PVdF) and polyvinylidene fluoride-hexafluoropropylene (PVdF-HFP) copolymer; conjugated diene polymers such as styrene-butadiene copolymer (SBR) and acrylonitrile-butadiene copolymer (NBR); hydrogenated conjugated diene polymers; and polymers including a (meth)acrylic acid alkyl ester monomer unit (acrylic polymers). Note that one of these other binders may be used individually, or two or more of these other binders may be used in combination in a freely selected ratio.

The glass-transition temperature of another binder that is a polymer is preferably −40° C. or higher, more preferably −30° C. or higher, and even more preferably −20° C. or higher, and is preferably 20° C. or lower, more preferably 15° C. or lower, and even more preferably 10° C. or lower. Low-temperature output characteristics of a secondary battery can be further improved when the glass-transition temperature of another binder is −40° C. or higher, whereas dusting resistance of the adhesive material can be improved when the glass-transition temperature of another binder is 20° C. or lower.

The presently disclosed slurry for a secondary battery preferably contains 1 part by mass or more, more preferably 5 parts by mass or more, and even more preferably 10 parts by mass or more of another binder per 100 parts by mass of the previously described particulate polymer having a core-shell structure, and preferably contains 30 parts by mass or less, more preferably 25 parts by mass or less, and even more preferably 20 parts by mass or less of another binder per 100 parts by mass of the particulate polymer. Dusting resistance of the adhesive material can be improved when the content of another binder is 1 part by mass or more per 100 parts by mass of the particulate polymer, whereas low-temperature output characteristics of a secondary battery can be further improved when the content of another binder is 30 parts by mass or less per 100 parts by mass of the particulate polymer.

<Production Method of Slurry for Non-Aqueous Secondary Battery>

The presently disclosed slurry for a secondary battery can be produced by, for example, mixing the particulate polymer having a core-shell structure, the polyhydric alcohol compound, water, and other components that are optionally used, such as another binder. The mixing can be performed using a typical stirring vessel, ball mill, sand mill, bead mill, pigment disperser, ultrasonic disperser, grinding machine, homogenizer, planetary mixer, FILMIX, or the like. Although no specific limitations are placed on the mixing conditions, the mixing can normally be performed in a range of from room temperature to 80° C. for a period of 10 minutes to several hours.

The amount of coarse particles having a diameter of 10 μm or more contained in the presently disclosed slurry for a secondary battery is preferably 100 ppm or less, more preferably 50 ppm or less, even more preferably 10 ppm or less, and particularly preferably 9 ppm or less. When the amount of coarse particles having a diameter of 10 μm or more is 100 ppm or less, battery members can be even more strongly adhered via the adhesive material. Note that coarse particles contained in the slurry for a secondary battery are normally formed of the previously described particulate polymer having a core-shell structure and/or another binder such as previously described.

<Separator for Non-Aqueous Secondary Battery>

The presently disclosed separator for a non-aqueous secondary battery includes an adhesive material provided in plurality in a dotted form on one surface or both surfaces of a separator substrate. The adhesive material is a dried product of the presently disclosed slurry for a non-aqueous secondary battery set forth above.

The separator including the adhesive material that is a dried product of the presently disclosed slurry for a non-aqueous secondary battery disposed in plurality on one surface or both surfaces can strongly adhere to another battery member (for example, an electrode) when the separator is affixed to the other battery member at a surface where the adhesive material is arranged (formed) (hereinafter, referred to as an "arrangement (formation) surface"). Moreover, as a result of the adhesive material being formed in plurality in a dotted form on the separator substrate, electrolyte solution injectability of a secondary battery can be improved, and the secondary battery can be caused to display excellent low-temperature output characteristics.

<Separator Substrate>

The separator substrate can be any known separator substrate without any specific limitations. Moreover, the separator substrate may have a porous membrane layer formed at one surface or both surfaces thereof.

Note that the separator substrate and the porous membrane layer can, without any specific limitations, be any separator substrate and porous membrane layer that can be used in the field of secondary batteries, such as any of those described in JP2012-204303A or JP2013-145763A. The porous membrane layer is a layer containing non-conductive particles such as described in JP2013-145763A, for example.

<Adhesive Material>

The adhesive material arranged (formed) on the surface of the separator substrate set forth above is a dried product of the presently disclosed slurry for a non-aqueous secondary battery as previously described. In other words, the dried product contains at least a polymer derived from the previously described particulate polymer having a core-shell structure and optionally contains another binder such as previously described. Although the dried product may contain residual polyhydric alcohol compound and water that have not evaporated through drying, the water content of the adhesive material is preferably 5 mass % or less, more preferably 3 mass % or less, even more preferably 1 mass % or less, particularly preferably 0.5 mass % or less, and most preferably 0 mass % (below the limit of detection).

The dotted adhesive material may be arranged (formed) uniformly over the entirety of the arrangement (formation) surface or may be arranged (formed) in an array such as to have a specific pattern, such as a striped pattern, a dotted pattern, or a lattice pattern, in plan view. Of these examples, arrangement (formation) of the dotted adhesive material in a striped shape is preferable from a viewpoint of increasing electrolyte solution injectability in production of a secondary battery using the presently disclosed separator. Note that in a case in which a fine dotted adhesive material is arranged in a specific pattern, it is preferable that the adhesive material is formed by supplying the slurry for a secondary battery onto the separator substrate in the desired pattern by an inkjet method from a viewpoint of ease of formation and arrangement of the adhesive material.

The cross-sectional shape of the adhesive material can be a protruding shape, a protruding/depressed shape, or a depressed shape without any specific limitations, and is preferably a protruding/depressed shape from a viewpoint of more strongly adhering the separator to an adjacent battery member (for example, an electrode) via the adhesive material. Note that the cross-sectional shape of the adhesive material can be altered by adjusting the drying conditions in formation of the adhesive material using the presently disclosed slurry for a secondary battery, for example.

The formed amount of the adhesive material is preferably not less than $0.1$ g/m$^2$ and not more than $100$ g/m$^2$, more preferably not less than $0.1$ g/m$^2$ and not more than $50$ g/m$^2$, even more preferably not less than $0.1$ g/m$^2$ and not more than $10$ g/m$^2$, and particularly preferably not less than $0.1$ g/m$^2$ and not more than $1$ g/m$^2$. When the formed amount of the adhesive material is $0.1$ g/m$^2$ or more, the separator can be more strongly adhered to an adjacent battery member (for example, an electrode) via the adhesive material. On the other hand, when the formed amount of the adhesive material is $100$ g/m$^2$ or less, the separator can be efficiently produced.

Note that the "formed amount of the adhesive material" referred to in the present disclosure is the amount of the adhesive material that is formed per unit area of the arrangement (formation) surface and can be calculated by dividing the mass of the adhesive material that is formed on the arrangement (formation) surface by the area of the arrangement (formation) surface on which the adhesive material has been formed.

In a case in which the adhesive material is formed at one or more locations, and preferably two or more locations, on the arrangement (formation) surface, the formation area of the adhesive material formed on the arrangement (formation) surface per location is preferably 25 μm$^2$ or more, more preferably 50 μm$^2$ or more, and even more preferably 100 μm$^2$ or more, and is preferably 250,000 μm$^2$ or less, more preferably 200,000 μm$^2$ or less, and even more preferably 100,000 μm$^2$ or less. When the formation area of the adhesive material per location is 25 μm$^2$ or more, the separator can be more strongly adhered to an adjacent battery member (for example, an electrode) via the adhesive material. Moreover, when the formation area of the adhesive material per location is 250,000 μm$^2$ or less, the separator can be efficiently produced.

Note that the formation area can be adjusted by altering the amount, shape, and range of supply of the presently disclosed slurry for a secondary battery to the arrangement (formation) surface. Specifically, in a case in which the adhesive material is formed by an inkjet method using the presently disclosed slurry for a secondary battery, for example, the formation area can be adjusted by altering the gradation of ejection of the slurry for a secondary battery from nozzles of an inkjet head (i.e., the number of ejections at the same point).

<Production Method of Separator for Non-Aqueous Secondary Battery>

The presently disclosed separator can be produced by supplying the presently disclosed slurry for a secondary battery to the separator substrate surface in a dotted form by an inkjet method or the like (preferably an inkjet method), and then drying the slurry for a secondary battery on the separator substrate. The supply conditions and the drying conditions of the slurry for a secondary battery can be adjusted as appropriate depending on the desired plan view shape, cross-sectional shape, formed amount, and formation area per location of the adhesive material.

Moreover, the presently disclosed separator can be obtained as an intermediate product when implementing the subsequently described "Production method of laminate for non-aqueous secondary battery".

(Electrode for Non-Aqueous Secondary Battery)

The presently disclosed electrode for a non-aqueous secondary battery includes an adhesive material provided in plurality in a dotted form on one surface or both surfaces of an electrode substrate. The adhesive material is a dried product of the presently disclosed slurry for a non-aqueous secondary battery set forth above.

The electrode including the adhesive material that is a dried product of the presently disclosed slurry for a non-aqueous secondary battery disposed in plurality at one surface or both surfaces can strongly adhere to another battery member (for example, a separator) when the electrode is affixed to the other battery member at an arrangement (formation) surface of the adhesive material. Moreover, as a result of the adhesive material being formed in plurality in a dotted form on the electrode substrate, electrolyte solution injectability of a secondary battery can be improved, and the secondary battery can be caused to display excellent low-temperature output characteristics.

<Electrode Substrate>

The electrode substrate can be any known electrode substrate without any specific limitations. For example, an electrode composed of an electrode substrate that includes an electrode mixed material layer formed at one surface or both surfaces of a current collector can be used as the electrode substrate or an electrode that further includes a porous membrane layer formed on an electrode mixed material layer of an electrode substrate can be used as the electrode substrate.

Note that the current collector, the electrode mixed material layer, and the porous membrane layer can, without any specific limitations, be any current collector, electrode mixed material layer, and porous membrane layer that can be used in the field of secondary batteries, such as any of those described in JP2013-145763A.

<Adhesive Material>

The adhesive material arranged (formed) on the surface of the electrode substrate set forth above is a dried product of the presently disclosed slurry for a non-aqueous secondary battery as previously described. In other words, the dried product contains at least a polymer derived from the previously described particulate polymer having a core-shell structure and optionally contains another binder such as previously described. Although the dried product may contain residual polyhydric alcohol compound and water that have not evaporated through drying, the water content of the adhesive material is preferably 5 mass % or less, more preferably 3 mass % or less, even more preferably 1 mass % or less, particularly preferably 0.5 mass % or less, and most preferably 0 mass % (below the limit of detection).

Note that preferred examples and/or ranges for the plan view shape, cross-sectional shape, formed amount, and formation area per location of the adhesive material arranged (formed) on the electrode substrate are the same as the preferred examples and/or ranges for the plan view shape, cross-sectional shape, formed amount, and formation area per location of the adhesive material arranged (formed) on the separator substrate that were previously described in the "Separator for non-aqueous secondary battery" section.

<Production Method of Electrode for Non-Aqueous Secondary Battery>

The presently disclosed electrode can be produced by supplying the presently disclosed slurry for a secondary battery to the electrode substrate surface in a dotted form by an inkjet method or the like (preferably an inkjet method), and then drying the slurry for a secondary battery on the electrode substrate. The supply conditions and the drying conditions of the slurry for a secondary battery can be adjusted as appropriate depending on the desired plan view shape, cross-sectional shape, formed amount, and formation area per location of the adhesive material.

Moreover, the presently disclosed electrode can be obtained as an intermediate product when implementing the subsequently described "Production method of laminate for non-aqueous secondary battery".

(Laminate for Non-Aqueous Secondary Battery)

The presently disclosed laminate for a secondary battery includes an electrode and a separator that are affixed to each other via an adhesive material. The adhesive material is a dried product of the presently disclosed slurry for a non-aqueous secondary battery set forth above.

The electrode that is affixed to the separator and is a constituent of the laminate for a secondary battery may be just a positive electrode, just a negative electrode, or both a positive electrode and a negative electrode. Moreover, in a case in which both a positive electrode and a negative electrode are affixed to a separator to obtain the laminate for a secondary battery, the number of positive electrodes, the number of negative electrodes, and the number of separators included in the laminate for a secondary battery may be 1 or may be 2 or more. In other words, the structure of the presently disclosed laminate for a secondary battery may be any of the following structures (1) to (6).

(1) Positive electrode/Separator
(2) Negative electrode/Separator
(3) Positive electrode/Separator/Negative electrode
(4) Positive electrode/Separator/Negative electrode/Separator
(5) Separator/Positive electrode/Separator/Negative electrode
(6) Structure in which positive electrodes and negative electrodes are stacked alternately with separators in-between (for example, "separator/negative electrode/separator/positive electrode/separator/negative electrode . . . /separator/positive electrode", etc.)

<Electrode and Separator>

Known electrodes and separators can be used as the electrode and the separator without any specific limitations. Specifically, an electrode composed of an electrode substrate such as previously described in the "Electrode for non-aqueous secondary battery" section can be used as a known electrode, and a separator composed of a known separator substrate such as previously described in the "Separator for non-aqueous secondary battery" section can be used as a known separator.

<Adhesive Material>

The adhesive material adhering the electrode and the separator is a dried product of the presently disclosed slurry for a non-aqueous secondary battery as previously described. In other words, the dried product contains at least a polymer derived from the previously described particulate polymer having a core-shell structure and optionally contains another binder such as previously described. Although the dried product may contain residual polyhydric alcohol compound and water that have not evaporated through drying, the water content of the adhesive material is preferably 5 mass % or less, more preferably 3 mass % or less, even more preferably 1 mass % or less, particularly preferably 0.5 mass % or less, and most preferably 0 mass % (below the limit of detection).

Note that preferred examples and/or ranges for the plan view shape, cross-sectional shape, formed amount, and formation area per location of the adhesive material arranged (formed) between the electrode and the separator are the same as the preferred examples and/or ranges for the plan view shape, cross-sectional shape, formed amount, and formation area per location of the adhesive material arranged (formed) on the separator substrate that were previously described in the "Separator for non-aqueous secondary battery" section. Note that in calculation of the formed amount of the adhesive material that is arranged (formed) between the electrode and the separator, the "area of the arrangement (formation) surface" is the area of a section where the electrode and the separator are in contact when they are affixed to each other (i.e., in a case in which one of the electrode and the separator is smaller than the other, the "area of the arrangement (formation) surface" corresponds to the area of the affixing surface of whichever of the electrode and the separator is smaller).

<Production Method of Laminate for Non-Aqueous Secondary Battery>

The laminate for a secondary battery set forth above can, without any specific limitations, be produced through, for example:

a step (A) of supplying the presently disclosed slurry for a non-aqueous secondary battery to an affixing surface of at least one of the electrode and the separator (i.e., an arrangement (formation) surface of the adhesive material) by an inkjet method or the like;

a step (B) of conveying the electrode and the separator to an affixing start position without bringing another member into contact with the affixing surface to which the slurry for a non-aqueous secondary battery has been supplied, and drying the slurry for a non-aqueous secondary battery during conveyance; and a step (C) of affixing the electrode and the separator to each other via the affixing surface after step (B).

<<Step (A)>>

In step (A), the presently disclosed slurry for a secondary battery set forth above is supplied to an affixing surface of at least one of the electrode and the separator by an inkjet method or the like (preferably an inkjet method).

The conditions in the inkjet method or the like are not specifically limited so long as the slurry for a secondary battery can be applied in a dotted form and can be adjusted as appropriate depending on the desired properties (formed amount, formation area, etc.) of the adhesive material that is to be obtained.

<<Step (B)>>

In step (B), the electrode and the separator are conveyed to an affixing start position without bringing another member into contact with the affixing surface to which the slurry for a secondary battery has been supplied, while also drying the slurry for a non-aqueous secondary battery during conveyance. By not bringing another member into contact with the affixing surface to which the slurry for a secondary battery has been supplied, problems such as blocking do not occur, which makes it possible to efficiently produce the laminate for a secondary battery.

Note that the "affixing start position" referred to in the present disclosure is a position at which an affixing surface of the electrode and an affixing surface of the separator come into contact when the electrode and the separator are affixed to each other.

Note that the conveying of the electrode and the separator can be performed by any conveying mechanism such as a roller, a belt conveyor, a manipulator, or a suction band, for example, without any specific limitations. Of these examples, it is preferable that at least one of the electrode and the separator is conveyed by a roller from a viewpoint of further increasing production efficiency of the laminate for a secondary battery.

The drying of the slurry for a secondary battery can be performed using a heating device such as a heater, a dryer, a heating roller, or the like without any specific limitations. The temperature of the electrode and/or separator to which the slurry for a secondary battery has been supplied during drying is not specifically limited but is preferably 0° C. or higher, more preferably 10° C. or higher, and even more preferably 15° C. or higher, and is preferably 200° C. or lower, more preferably 150° C. or lower, and even more preferably 100° C. or lower. When the temperature during drying is 0° C. or higher, the drying rate can be sufficiently increased, and the laminate for a secondary battery can be efficiently produced. Moreover, when the temperature during drying is 200° C. or lower, the adhesive material obtained after drying can be provided with a good shape, and the electrode and the separator can be well adhered to each other.

<<Step (C)>>

In step (C), the electrode and the separator are affixed to each other via the affixing surface. This affixing can be performed through pressing and/or heating of a laminate in which the electrode and the separator are stacked via the affixing surface, for example, but is not specifically limited to being performed in this manner.

Note that the pressure applied to the laminate, the temperature when affixing the electrode and the separator to each other, and the duration of pressing and/or heating of the laminate in step (C) can be adjusted as appropriate depending on the type and amount of a used binder, such as the particulate polymer.

<Example of Production Apparatus of Laminate for Non-Aqueous Secondary Battery>

Figure 2:
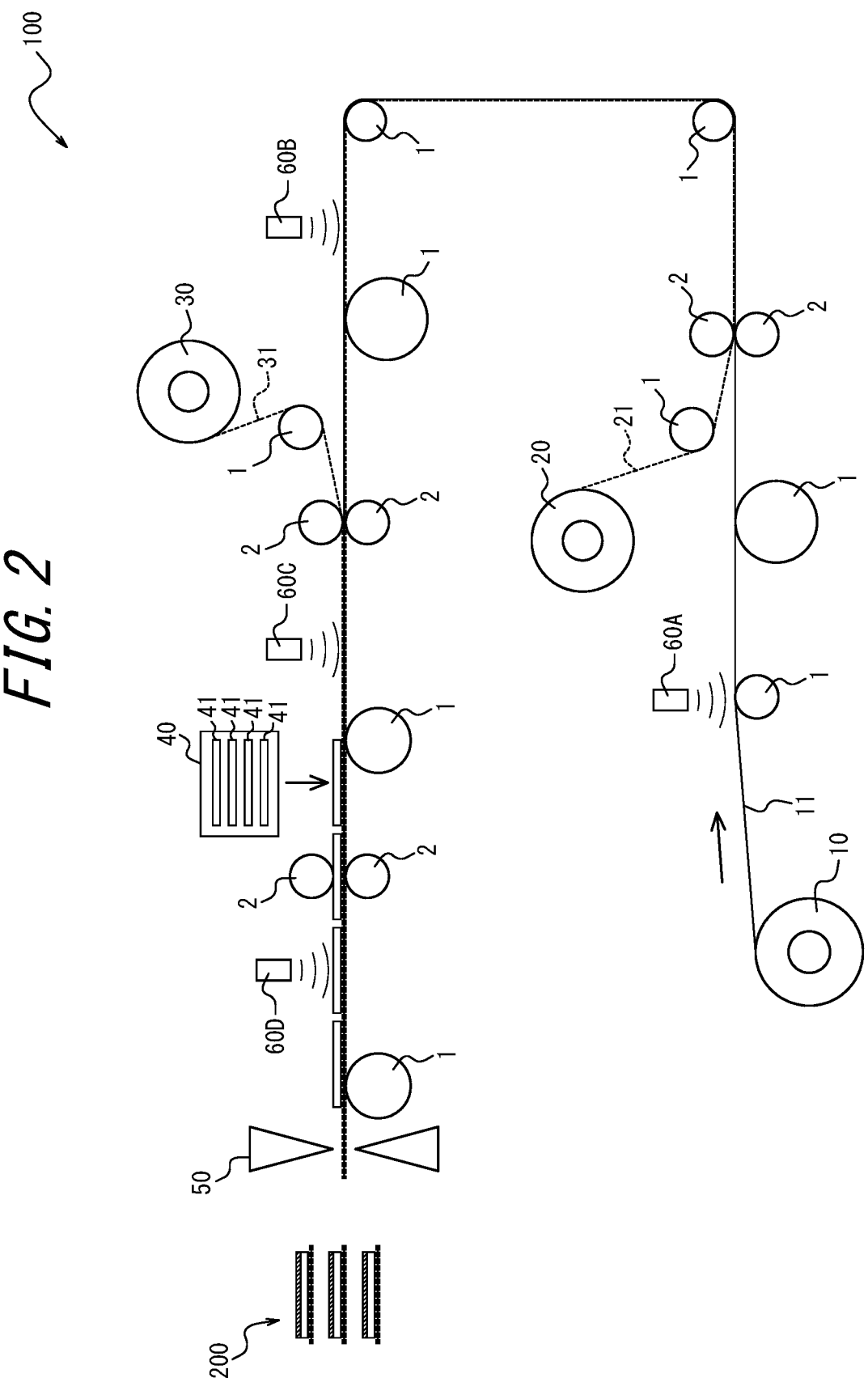
FIG. 2 is an explanatory diagram illustrating schematic configuration of one example of a production apparatus of a laminate for a non-aqueous secondary battery.

Production of the presently disclosed laminate for a secondary battery using the method of producing a laminate for a secondary battery set forth above can be performed using a production apparatus 100 such as illustrated in FIG. 2, for example, but is not specifically limited to being performed in this manner.

The production apparatus 100 illustrated in FIG. 2 is an apparatus that produces a laminate 200 for a secondary battery in which electrodes (positive electrode and negative electrode) and separators are stacked in an order of "positive electrode/separator/negative electrode/separator" from top to bottom. Note that in this production apparatus 100, the obtained laminate 200 for a secondary battery is cut to an appropriate size and then further stacked before being used in secondary battery production.

The production apparatus 100 includes a negative electrode roll 10 that is obtained by winding up a negative electrode 11 as a roll, a first separator roll 20 and a second separator roll 30 that are obtained by winding up separators 21 and 31, respectively, as rolls, and a positive electrode stocker 40 that houses pre-cut positive electrodes 41. The production apparatus 100 further includes a plurality of (9 in the illustrated example) conveying rollers 1, a plurality of (3 pairs in the illustrated example) pressing rollers 2, a plurality of (4 in the illustrated example) slurry feeders 60A, 60B, 60C, and 60D, and a cutting machine 50.

Figure 3:
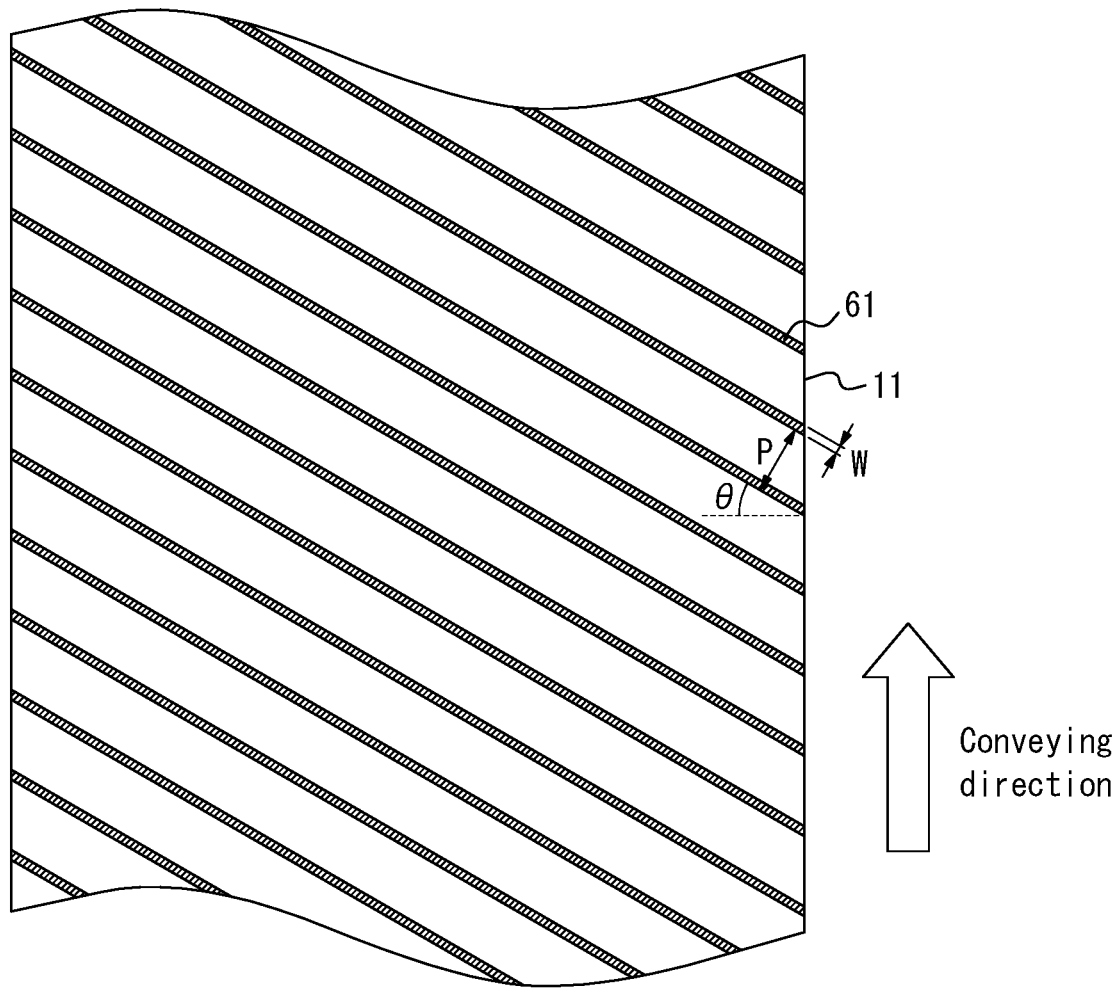
FIG. 3 is a plan view illustrating one example of a coating pattern of a slurry for a non-aqueous secondary battery.

In the production apparatus 100, a slurry 61 for a secondary battery is first supplied from the slurry feeder 60A to a surface (upper surface in the illustrated example) of a negative electrode 11 that has been fed out from the negative electrode roll 10 and conveyed via a conveying roller 1 such that the slurry 61 forms a coating pattern having a diagonally striped shape such as illustrated in FIG. 3, for example (step (A)). In plan view, the diagonally striped coating pattern illustrated in FIG. 3 has an angle formed with a direction orthogonal to the conveying direction (measured from a narrow angle side) of θ, an arrangement pitch of P, and a width of W. The negative electrode 11 that has been supplied with the slurry for a secondary battery and a separator 21 that has been fed out from the first separator roll 20 are conveyed to an affixing start position at which pressing rollers 2 are located. The slurry 61 for a secondary battery can be dried by, for example, using a heating roller as a conveying roller 1 that is located between the slurry feeder 60A and the pressing rollers 2 in the production apparatus 100 (step (B)). Next, the negative electrode 11 and the separator 21 are affixed to each other by the pressing rollers 2 (step (C)).

Moreover, in the production apparatus 100, a slurry 61 for a secondary battery is supplied from the slurry feeder 60B to a surface at the negative electrode 11 side of the laminate in which the negative electrode 11 and the separator 21 have been affixed using an adhesive material (dried product of slurry for secondary battery) such that the slurry 61 forms a coating pattern having a diagonally striped shape such as illustrated in FIG. 3, for example (step (A)). The laminate of the negative electrode 11 and separator 21 that has been supplied with the slurry for a secondary battery and a separator 31 that has been fed out from the second separator roll 30 are conveyed to an affixing start position at which pressing rollers 2 are located. The slurry 61 for a secondary battery can be dried by, for example, using a heating roller as a conveying roller 1 that is located between the slurry feeder 60B and the pressing rollers 2 in the production apparatus 100 (step (B)). Next, the laminate of the negative electrode 11 and separator 21 and the separator 31 are affixed to each other by the pressing rollers 2 (step (C)).

Furthermore, in the production apparatus 100, a slurry 61 for a secondary battery is supplied from the slurry feeder 60C to a surface at the separator 31 side of the laminate in which the negative electrode 11 and the separators 21 and 31 have been affixed to each other using an adhesive material (dried product of slurry for secondary battery) such that the slurry 61 forms a coating pattern having a diagonally striped shape like that illustrated in FIG. 3, for example (step (A)). At an affixing start position, a positive electrode 41 is placed on the separator 31 of the laminate of the negative electrode 11 and separators 21 and 31 that has been supplied with the slurry for a secondary battery. The slurry 61 for a secondary battery can be dried by, for example, using a heating roller as a conveying roller 1 that is located between the slurry feeder 60C and pressing rollers 2 in the production apparatus 100 (step (B)). Next, the laminate of the negative electrode 11 and separators 21 and 31 and the positive electrode 41 are affixed to each other by the pressing rollers 2 (step (C)).

In addition, in the production apparatus 100, a slurry 61 for a secondary battery is supplied from the slurry feeder 60D to a surface at the positive electrode side of the laminate 200 for a secondary battery in which stacking has been performed in an order of "positive electrode/separator/negative electrode/separator" from top to bottom such that the slurry 61 forms a coating pattern having a diagonally striped shape like that illustrated in FIG. 3, for example, and the laminate 200 for a secondary battery is subsequently cut by the cutting machine 50.

Note that laminates obtained through cutting of the laminate 200 for a secondary battery by the cutting machine 50 are further stacked before being used in secondary battery production.

(Non-Aqueous Secondary Battery)

The presently disclosed secondary battery includes at least one selected from the group consisting of the presently disclosed separator, the presently disclosed electrode, and the presently disclosed laminate for a secondary battery set forth above. For example, the presently disclosed secondary battery may include a positive electrode, a negative electrode, an electrolyte solution, and a separator. The presently disclosed electrode can be used as either or both of the positive electrode and the negative electrode in the presently disclosed secondary battery, for example. Moreover, the presently disclosed separator can be used as the separator in the presently disclosed secondary battery, for example. Furthermore, the presently disclosed laminate for a secondary battery can be used as a laminate of the positive electrode and the separator, a laminate of the negative electrode and the separator, or a laminate of the positive electrode, the separator, and the negative electrode in the presently disclosed secondary battery, for example.

The presently disclosed secondary battery has excellent low-temperature output characteristics as a result of including at least one selected from the group consisting of the presently disclosed separator, the presently disclosed electrode, and the presently disclosed laminate for a secondary battery set forth above.

<Electrodes>

The presently disclosed electrode set forth above or a known electrode other than the presently disclosed electrode can be used as each electrode in the presently disclosed secondary battery. The known electrode other the presently disclosed electrode can be an electrode composed of an electrode substrate such as previously described in the "Electrode for non-aqueous secondary battery" section.

<Electrolyte Solution>

The electrolyte solution is normally an organic electrolyte solution obtained by dissolving a supporting electrolyte in an organic solvent. For example, a lithium salt can be used as the supporting electrolyte in a case in which the secondary battery is a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples of organic solvents in a case in which the secondary battery is a lithium ion secondary battery include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

The concentration of the electrolyte in the electrolyte solution may be adjusted as appropriate. Furthermore, known additives may be added to the electrolyte solution.

<Separator>

The presently disclosed separator set forth above or a known separator other than the presently disclosed separator can be used as the separator in the presently disclosed secondary battery. The known separator other than the presently disclosed separator can be a separator composed of a separator substrate such as previously described in the "Separator for non-aqueous secondary battery" section.

<Production Method of Secondary Battery>

The presently disclosed secondary battery can be produced by, for example, performing rolling, folding, or the like, as necessary depending on the battery shape, of a stack obtained through stacking of the positive electrode, the separator, and the negative electrode, placing the stack in a device container, injecting the electrolyte solution into the device container, and sealing the device container. Note that the presently disclosed laminate for a secondary battery may be used as the stack, or a plurality of the presently disclosed laminate for a secondary battery may be stacked to produce the stack. Moreover, the stack may be produced by stacking the positive electrode, the separator, and the negative electrode, with a presently disclosed battery member (electrode or separator) used as at least one of the positive electrode, the separator, and the negative electrode. Furthermore, the stack may be produced by stacking the presently disclosed laminate for a secondary battery and a presently disclosed battery member (electrode or separator). In order to prevent internal pressure increase and occurrence of overcharging or overdischarging, an overcurrent preventing device such as a fuse or a PTC device, an expanded metal, a lead plate, or the like may be provided in the presently disclosed secondary battery. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the glass-transition temperatures of a particulate polymer and another binder, the proportion of THF-insoluble content, volume-average particle diameter, and degree of swelling in electrolyte solution of a particulate polymer, the content of coarse particles having a diameter of 10 μm or more, inhibition of nozzle clogging during supply by an inkjet method, and drying efficiency of a slurry for a non-aqueous secondary battery, the dusting resistance and formation area per location of an adhesive material, the dry adhesive strength of an electrode and a separator, and the electrolyte solution injectability and low-temperature output characteristics of a secondary battery.

<Glass-Transition Temperature (Tg)>

For each of a core portion and a shell portion of a particulate polymer, a water dispersion containing a polymer (polymer of core portion or polymer of shell portion) was produced under the same polymerization conditions as for the core portion or the shell portion using the monomers, various additives, and so forth used in production of the core portion or the shell portion, and then the water dispersion was dried to obtain a measurement sample. In addition, a water dispersion containing another binder was produced and was then dried to obtain a measurement sample. For each of the measurement samples, 10 mg of the measurement sample was measured into an aluminum pan and was then measured in a differential scanning calorimeter (EXSTAR DSC6220 produced by SII NanoTechnology Inc.) under conditions prescribed by JIS Z 8703 with a measurement temperature range of −100° C. to 500° C. and a heating rate of 10° C./min, and using an empty aluminum pan as a reference, to obtain a differential scanning calorimetry (DSC) curve. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Proportion of THF-Insoluble Content>

A water dispersion of a particulate polymer was dried in an environment of 50% humidity and 23° C. to 25° C. to prepare a film having a thickness of 3±0.3 mm. The prepared film was cut up into 5 mm squares to prepare a plurality of film pieces, and then approximately 1 g of these film pieces were precisely weighed and the weight thereof was taken to be W0 (g). The precisely weighed film pieces (weight W0) were immersed in 100 g of tetrahydrofuran (THF) for 24 hours. Thereafter, the film pieces were pulled out of the THF, were subsequently vacuum dried at 105° C. for 3 hours, and then the weight W1 (g) thereof (weight of insoluble content) was precisely weighed. The proportion of THF-insoluble content (mass %) was calculated by the following formula.

Proportion of THF-insoluble content (mass %)=$W1/W0 \times 100$

<Volume-Average Particle Diameter>

A particle diameter distribution (volume basis) was measured with respect to a water dispersion of a particulate polymer that had been adjusted to a solid content concentration of 0.1 mass % using a laser diffraction particle diameter distribution analyzer (produced by Beckman Coulter, Inc.; product name: LS-230). In the measured particle diameter distribution, the particle diameter at which the cumulative volume calculated from a small-diameter end of the distribution reached 50% was taken to be the volume-average particle diameter (D50).

<Degree of Swelling in Electrolyte Solution>

A water dispersion of a particulate polymer was dried, and then approximately 0.2 g of the resultant dried product was pressed at 200° C. and 5 MPa for 2 minutes to obtain a film. The obtained film was cut to a 1 cm square to obtain a test specimen, and the weight W2 (g) of the test specimen was measured. Next, the test specimen was immersed in electrolyte solution at 60° C. for 72 hours. Thereafter, the test specimen was removed from the electrolyte solution, electrolyte solution on the surface of the test specimen was wiped off, and the weight W3 (g) of the test specimen was measured. The degree of swelling in electrolyte solution (factor) was calculated by the following formula.

Degree of swelling in electrolyte solution (factor)=$W3/W2$

Note that the electrolyte solution used for measurement was an electrolyte solution obtained by dissolving $LiPF_6$ in a concentration of 1 mol/L as a supporting electrolyte in a mixed solvent obtained by mixing ethylene carbonate (EC), diethyl carbonate (DEC), and vinylene carbonate (VC) in a volume ratio of EC/DEC/VC=68.5/30/1.5.

<Content of Coarse Particles>

The mass (B) of nylon mesh having an average pore diameter of 10 μm was measured, and then the nylon mesh was set in a funnel. Next, 100 g of a slurry for a non-aqueous secondary battery was poured into the funnel and was filtered. Deionized water was subsequently poured into the funnel to perform washing until clouding disappeared, and then the nylon mesh was dried in a 90° C. oven for at least 60 minutes. The nylon mesh was left to cool and then the mass (A) thereof was measured in order to measure the amount of mesh residue. The amount of mesh residue, which in other words was the amount of coarse particles having a particle diameter of 10 μm or more in the slurry, was determined by the following formula.

Content of coarse particles (ppm)=$(A-B)/(C \times D/100) \times 1{,}000{,}000$

A: Mass of mesh+dried product (g)
B: Mass of mesh (g)
C: Mass of filtered slurry (g)
D: Total solid content concentration of slurry (%)

<Inhibition of Nozzle Clogging>

A slurry for a non-aqueous secondary battery was discharged using an inkjet-type slurry feeder including an inkjet head (produced by Konica; product name: KM1024 (shear-mode type)) under conditions such that the projection velocity was 6 m/s to 10 m/s. Discharge was suspended, the inkjet-type slurry feeder was left to stand, and then nozzle clogging was evaluated by the following standard based on whether or not discharge could be restarted.

A: Discharge can be restarted even after a standing time of 30 minutes or more.
B: Discharge can be restarted after a standing time of less than 20 minutes but cannot be restarted due to nozzle clogging after a standing time of not less than 20 minutes and less than 30 minutes.

C: Discharge can be restarted after a standing time of less than 10 minutes but cannot be restarted due to nozzle clogging after a standing time of not less than 10 minutes and less than 20 minutes.

D: Discharge cannot be restarted due to nozzle clogging after a standing time of less than 10 minutes.

<Drying Efficiency>

A slurry for a non-aqueous secondary battery was dried at 65±5° C. on PET (polyethylene terephthalate) film. The time from the start of drying until the contact angle of the slurry on the PET film was 1° or less was taken to be the drying time and was evaluated by the following standard. A shorter drying time indicates that drying of the slurry is easier. Note that measurement of the contact angle was performed using a portable goniometer (produced by Kyowa Interface Science Co., Ltd.; product name: PCA-1).

A: Drying time of less than 300 s
B: Drying time of not less than 300 s and less than 400 s
C: Drying time of not less than 400 s and less than 500 s
D: Drying time of 500 s or more <Dusting Resistance>

Under the same conditions as in each example or comparative example, a negative electrode before affixing to a separator but after formation of an adhesive material on one surface was sampled, and a square of 5 cm×5 cm was cut out to obtain a test specimen A (negative electrode having adhesive material formed on one surface). The obtained test specimen A was loaded into a 500 mL glass bottle and was shaken at 300 rpm for 3 hours using a shaking machine. The mass of adhesive material in the test specimen A before shaking was taken to be a, the mass of the adhesive material in the test specimen A after shaking was taken to be b, and the fraction $X_A$ of powder (adhesive material) detached through shaking ($X_A$ (mass %)=(a−b)/a×100) was calculated.

In addition, a test specimen B (separator having adhesive material formed on one surface) was obtained through the same operations as the operations by which the test specimen A was obtained with the exception that a separator was used instead of a negative electrode. The fraction $X_B$ of powder (adhesive material) detached through shaking was calculated for the obtained test specimen B by performing the same operations as for the fraction $X_A$ of the test specimen A.

A fraction X that was an average value of the fraction $X_A$ and the fraction $X_B$ was calculated and was evaluated by the following standard. A smaller value for the fraction X indicates that a smaller proportion of powder has detached and that the adhesive material has better dusting resistance.

A: Fraction X of less than 1 mass %
B: Fraction X of not less than 1 mass % and less than 4 mass %
C: Fraction X of not less than 4 mass % and less than 7 mass %
D: Fraction X of 7 mass % or more <Formation Area Per Location>

The major axis diameter x and the minor axis diameter y of a dotted adhesive material formed in a 2 mm² region were measured using a laser microscope (VR-3100 produced by Keyence Corporation), z=(x+y)/2 was taken to be the average value thereof, the area of each dot was calculated as $S=\frac{1}{4}\pi z^2$, and the formation area $S_{50}$ of the adhesive material per location was calculated as the average value of the areas S of 50 dots.

<Dry Adhesive Strength>

A laminate obtained by affixing a separator and a negative electrode having an adhesive material formed on one surface to each other under the same conditions as in each example or comparative example (i.e., a laminate in which one negative electrode and one separator were affixed to each other via an adhesive material) was sampled to obtain a test specimen.

The test specimen was placed with the surface at the current collector side of the negative electrode facing downward and cellophane tape was affixed to the surface of the negative electrode. Tape prescribed by JIS Z1522 was used as the cellophane tape. The cellophane tape was secured to a horizontal test stage in advance. The stress when the separator was peeled off by pulling one end of the separator vertically upward at a pulling speed of 50 mm/min was measured.

This measurement was performed 6 times in total, the average value of the measured stresses was determined as the peel strength, and adhesiveness between the negative electrode and the separator was evaluated by the following standard. A larger peel strength indicates higher adhesiveness.

A: Peel strength of 5 N/m or more
B: Peel strength of not less than 3 N/m and less than 5 N/m
C: Peel strength of not less than 1 N/m and less than 3 N/m
D: Peel strength of less than 1 N/m <Electrolyte Solution Injectability>

A produced laminate for a secondary battery was enclosed in an aluminum packing case serving as a battery case, and electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained. This injection was performed with various different injection times.

The minimum injection time for which spillage of the electrolyte solution during injection did not occur was determined and was evaluated by the following standard. A shorter minimum injection time indicates better electrolyte solution injectability.

A: Minimum injection time of less than 100 s
B: Minimum injection time of not less than 100 s and less than 300 s
C: Minimum injection time of not less than 300 s and less than 500 s
D: Minimum injection time of 500 s or more <Low-Temperature Output Characteristics>

A produced secondary battery was constant-current constant-voltage (CCCV) charged to 4.3 V in an atmosphere having a temperature of 25° C. Thereafter, the electric capacity when the secondary battery was discharged to 3.0 V by a 0.2C constant-current method and the electric capacity when the secondary battery was discharged to 3.0 V by a 1C constant-current method in an atmosphere having a temperature of −10° C. were determined. The ratio of the electric capacities (=(electric capacity at 1C/electric capacity at 0.2C)×100(%)) was calculated. These measurements were performed for five secondary battery cells and the average value of the electric capacity ratios of the cells was evaluated by the following standard as a discharge capacity maintenance rate. A larger value indicates better low-temperature output characteristics.

A: Discharge capacity maintenance rate of 80% or more
B: Discharge capacity maintenance rate of not less than 70% and less than 80%
C: Discharge capacity maintenance rate of not less than 60% and less than 70%
D: Discharge capacity maintenance rate of less than 60%

Example 1

<Production of Particulate Polymer Having Core-Shell Structure>

First, in core portion formation, 88 parts of styrene as an aromatic vinyl monomer, 6 parts of n-butyl acrylate as a (meth)acrylic acid ester monomer, 5 parts of methacrylic acid as an acid group-containing monomer, 1 part of ethylene glycol dimethacrylate as a cross-linkable monomer, 1 part of sodium dodecylbenzenesulfonate as an emulsifier, 150 parts of deionized water, and 0.5 parts of potassium persulfate as a polymerization initiator were loaded into a 5 MPa pressure-resistant vessel equipped with a stirrer, were sufficiently stirred, and were then heated to 60° C. to initiate polymerization. At the point at which the polymerization conversion rate reached 96%, 80.7 parts of n-butyl acrylate as a (meth)acrylic acid ester monomer, 1 part of methacrylic acid, 18 parts of styrene as an aromatic vinyl monomer, and 0.3 parts of allyl methacrylate as a cross-linkable monomer were continuously added for shell portion formation, heating was performed to 70° C., and polymerization was continued. At the point at which the polymerization conversion rate reached 96%, the reaction was quenched by cooling to produce a water dispersion containing a particulate polymer. This water dispersion was used to measure the proportion of THF-insoluble content, volume-average particle diameter, and degree of swelling in electrolyte solution of the particulate polymer. Glass-transition temperatures of the particulate polymer (polymer of the core portion and polymer of the shell portion) were also separately measured. The results are shown in Table 1.

<Production of Other Binder>

A reactor equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and heating was performed to 60° C.

Meanwhile, a monomer mixture was obtained in a separate vessel by mixing 50 parts of deionized water, 0.5 parts of sodium dodecylbenzenesulfonate as an emulsifier, and 94 parts of n-butyl acrylate, 2 parts of acrylonitrile, 2 parts of methacrylic acid, 1 part of N-hydroxymethylacrylamide, and 1 part of allyl glycidyl ether as polymerizable monomers. The monomer mixture was continuously added to the aforementioned reactor over 4 hours to carry out polymerization. The reaction was carried out at 60° C. during this addition. Once the addition was completed, stirring was carried out at 70° C. for a further 3 hours to complete the reaction and produce a water dispersion containing an acrylic polymer (other binder). This water dispersion was used to measure the glass-transition temperature of the acrylic polymer. The result is shown in Table 1.

<Slurry for Non-Aqueous Secondary Battery>

Inside a stirring vessel, 87 parts in terms of solid content of the water dispersion of the particulate polymer and 13 parts (14.9 parts per 100 parts of particulate polymer) in terms of solid content of the water dispersion of the acrylic polymer were mixed. Next, 87 parts (100 parts per 100 parts of particulate polymer) of propylene glycol as a polyhydric alcohol compound was added to the resultant mixture, and deionized water was also added to obtain a slurry for a non-aqueous secondary battery having a solid content concentration of 15%.

The slurry for a non-aqueous secondary battery was used to measure or evaluate the content of coarse particles having a diameter of 10 μm or more, inhibition of nozzle clogging, and drying efficiency. The results are shown in Table 1.

<Formation of Negative Electrode>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. At the point at which the polymerization conversion rate reached 96%, the reaction was quenched by cooling to yield a mixture containing a binder for a negative electrode mixed material layer (SBR). The mixture containing the binder for a negative electrode mixed material layer was adjusted to pH 8 through addition of 5% sodium hydroxide aqueous solution and was then subjected to thermal-vacuum distillation to remove unreacted monomer. Thereafter, cooling was performed to 30° C. or lower to obtain a water dispersion containing the desired binder for a negative electrode mixed material layer.

Next, 100 parts of artificial graphite (volume-average particle diameter: 15.6 μm) as a negative electrode active material, 1 part in terms of solid content of a 2% aqueous solution of carboxymethyl cellulose sodium salt (produced by Nippon Paper Industries Co., Ltd.; product name: MAC350HC) as a viscosity modifier, and deionized water were mixed, were adjusted to a solid content concentration of 68%, and were then mixed at 25° C. for 60 minutes. The solid content concentration was further adjusted to 62% with deionized water and then a further 15 minutes of mixing was performed at 25° C. Deionized water and 1.5 parts in terms of solid content of the water dispersion containing the binder for a negative electrode mixed material layer described above were added to the resultant mixture, the final solid content concentration was adjusted to 52%, and a further 10 minutes of mixing was performed. The resultant mixture was subjected to a defoaming process under reduced pressure to yield a slurry composition for a secondary battery negative electrode having good fluidity.

The obtained slurry composition for a secondary battery negative electrode was applied onto copper foil (current collector) of 20 μm in thickness using a comma coater such as to have a thickness after drying of approximately 150 μm. The applied slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode having a negative electrode mixed material layer thickness of 80 μm.

<Formation of Positive Electrode>

A slurry composition for a secondary battery positive electrode was obtained by mixing 100 parts of $LiCoO_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent, adjusting these materials to a total solid content concentration of 70%, and mixing these materials using a planetary mixer.

The obtained slurry composition for a secondary battery positive electrode was applied onto aluminum foil (current collector) of 20 μm in thickness using a comma coater such as to have a thickness after drying of approximately 150 μm. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The obtained positive electrode web was rolled by a roll press to obtain a positive electrode including a positive electrode mixed material layer.

<Preparation of Separator>

A separator (product name: Celgard 2500) made of polypropylene (PP) was prepared.

<Production of Laminate for Secondary Battery>

A laminate for a lithium ion secondary battery was produced and cut by the production apparatus illustrated in FIG. 2 using the prepared slurry for a non-aqueous secondary battery, negative electrode, positive electrode, and separator.

Note that an inkjet-type slurry feeder including an inkjet head (produced by Konica; product name: KM1024 (shear-mode type)) was used as a slurry feeder.

Moreover, the conveyance speed was set as 10 m/min and the slurry was supplied as a coating pattern having the striped shape illustrated in FIG. 3 (0:45°; P: 200 μm; W: 30 μm). Moreover, the supplied slurry was dried by using heating rollers as some of the conveying rollers. Other production conditions were as follows.

Supplied amount of slurry for secondary battery: 0.5 g/m²
Drying temperature: 70° C.
Drying time: 1 s
Affixing pressure: 1 MPa·
Affixing temperature: 70° C.

When the dried slurry (adhesive material that was a dried product) was observed using a laser microscope, the adhesive material had a fine dotted form. In other words, an adhesive material provided in plurality in a fine dotted form was arranged in a diagonally striped pattern on an affixing surface. Moreover, when the average height (thickness) and the maximum height (thickness) of the adhesive material were confirmed through observation of a cross-section using a laser microscope, the cross-section had a protruding/depressed shape, the average height was 1 μm, and the maximum height was 3 μm. Moreover, the formed amount of the adhesive material was 0.5 g/m² and the formation area of the adhesive material per location was 5,000 μm².

The dry adhesive strength of the laminate for a secondary battery was evaluated. The result is shown in Table 1.

<Production of Secondary Battery>

Five cut laminates for a secondary battery were stacked and were pressed at a temperature of 70° C. and a pressure of 1 MPa for 10 seconds to obtain a stack.

The produced stack was enclosed in an aluminum packing case serving as a battery case, and electrolyte solution (solvent: ethylene carbonate/diethyl carbonate/vinylene carbonate=68.5/30/1.5 (volume ratio); electrolyte: $LiPF_6$ of 1 M in concentration) was injected. An opening of the aluminum packing case was subsequently closed by heat sealing at 150° C. to produce a stacked lithium ion secondary battery having a capacity of 800 mAh.

The electrolyte solution injectability and low-temperature output characteristics of the secondary battery were evaluated. The results are shown in Table 1.

Examples 2 to 4

A particulate polymer, another binder, a slurry for a non-aqueous secondary battery, a negative electrode, a positive electrode, a separator, a laminate for a secondary battery, and a secondary battery were prepared or produced in the same way as in Example 1 with the exception that the additive amount of propylene glycol as a polyhydric alcohol compound in production of the slurry for a non-aqueous secondary battery was changed as shown in Table 1. Measurements and evaluations were made in the same manner as in Example 1. The results are shown in Table 1.

Example 5

A particulate polymer, another binder, a slurry for a non-aqueous secondary battery, a negative electrode, a positive electrode, a separator, a laminate for a secondary battery, and a secondary battery were prepared or produced in the same way as in Example 1 with the exception that propylene glycol used as a polyhydric alcohol compound in production of the slurry for a non-aqueous secondary battery was changed to ethylene glycol. Measurements and evaluations were made in the same manner as in Example 1. The results are shown in Table 1.

Examples 6 to 8

A particulate polymer, another binder, a slurry for a non-aqueous secondary battery, a negative electrode, a positive electrode, a separator, a laminate for a secondary battery, and a secondary battery were prepared or produced in the same way as in Example 1 with the exception that monomers used in formation of the core portion and/or shell portion in production of the particulate polymer were changed as shown in Table 1. Measurements and evaluations were made in the same manner as in Example 1. The results are shown in Table 1.

Comparative Example 1

Another binder, a slurry for a non-aqueous secondary battery, a negative electrode, a positive electrode, a separator, a laminate for a secondary battery, and a secondary battery were prepared or produced in the same way as in Example 1 with the exception that a particulate polymer having a monophase structure (non-core-shell) that was produced as described below was used instead of the particulate polymer having a core-shell structure. Measurements and evaluations were made in the same manner as in Example 1. The results are shown in Table 1.

<Production of Particulate Polymer Having Monophase Structure (Non-Core-Shell)>

A reactor equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and heating was performed to 60° C.

Meanwhile, a monomer mixture was obtained in a separate vessel by mixing 50 parts of deionized water, 0.5 parts of sodium dodecylbenzenesulfonate as an emulsifier, and 40 parts of n-butyl acrylate, 1 part of methacrylic acid, 58 parts of styrene, and 1 part of divinylbenzene as polymerizable monomers. The monomer mixture was continuously added to the aforementioned reactor over 2 hours to carry out polymerization. The reaction was carried out at 60° C.

during this addition. Once the addition was completed, stirring was carried out at 70° C. for a further 2 hours to complete the reaction and produce a water dispersion containing a particulate polymer having a monophase structure (non-core-shell).

Comparative Example 2

A particulate polymer, another binder, a slurry for a non-aqueous secondary battery, a negative electrode, a positive electrode, a separator, a laminate for a secondary battery, and a secondary battery were prepared or produced in the same way as in Example 1 with the exception that propylene glycol was not added as a polyhydric alcohol compound in production of the slurry for a non-aqueous secondary battery. Measurements and evaluations were made in the same manner as in Example 1. The results are shown in Table 1.

Comparative Example 3

A particulate polymer, another binder, a slurry for a non-aqueous secondary battery, a negative electrode, a positive electrode, a separator, a laminate for a secondary battery, and a secondary battery were prepared or produced in the same way as in Example 1 with the exception that the additive amount of propylene glycol as a polyhydric alcohol compound in production of the slurry for a non-aqueous secondary battery was changed as shown in Table 1. Measurements and evaluations were made in the same manner as in Example 1. The results are shown in Table 1.

In Table 1, shown below:

"BA" indicates n-butyl acrylate unit;

"MAA" indicates methacrylic acid unit;

"ST" indicates styrene unit;

"DVB" indicates divinylbenzene unit;

"AMA" indicates allyl methacrylate unit;

"EDMA" indicates ethylene glycol dimethacrylate unit;

"ACL" indicates acrylic polymer;

"PG" indicates propylene glycol; and

"EG" indicates ethylene glycol.

TABLE 1

| | | | | | Example 1 | Example 2 | Example 3 | Example 4 | Example 5 | Example 6 |
|---|---|---|---|---|---|---|---|---|---|---|
| Slurry for secondary battery | Particulate polymer | Structure | | | Core-shell | Core-shell | Core-shell | Core-shell | Core-shell | Core-shell |
| | | Shell | Composition [mass %] | BA | 80.7 | 80.7 | 80.7 | 80.7 | 80.7 | 38.7 |
| | | | | MMA | 1 | 1 | 1 | 1 | 1 | 1 |
| | | | | ST | 18 | 18 | 18 | 18 | 18 | 60 |
| | | | | AMA | 0.3 | 0.3 | 0.3 | 0.3 | 0.3 | 0.3 |
| | | | Tg [° C.] | | −34 | −34 | −34 | −34 | −34 | 21 |
| | | Core | Composition [mass %] | ST | 88 | 88 | 88 | 88 | 88 | 88 |
| | | | | BA | 6 | 6 | 6 | 6 | 6 | 6 |
| | | | | MAA | 5 | 5 | 5 | 5 | 5 | 5 |
| | | | | EDMA | 1 | 1 | 1 | 1 | 1 | 1 |
| | | | Tg [° C.] | | 95 | 95 | 95 | 95 | 95 | 95 |
| | | Proportion of THF-insoluble content [mass %] | | | 85 | 85 | 85 | 85 | 85 | 85 |
| | | Volume-average particle diameter [nm] | | | 230 | 230 | 230 | 230 | 230 | 230 |
| | | Degree of swelling in electrolyte solution [factor] | | | 2 | 2 | 2 | 2 | 2 | 2 |
| | Other binder | Type | | | ACL | ACL | ACL | ACL | ACL | ACL |
| | | Tg [° C.] | | | 5 | 5 | 5 | 5 | 5 | 5 |
| | | Content [parts by mass (relative to 100 parts by mass of particulate polymer)] | | | 14.9 | 14.9 | 14.9 | 14.9 | 14.9 | 14.9 |
| | Polyhydric alcohol comound | Type | | | PG | PG | PG | PG | EG | PG |
| | | Content [parts by mass (relative to 100 parts by mass of particulate polymer)] | | | 100.0 | 250.0 | 70.0 | 10.0 | 100.0 | 100.0 |
| | | Content [parts by mass (relative to 100 parts by mass of water polymer)] | | | 12.6 | 38 | 8 | 1 | 12.6 | 12.6 |
| | Amount of coarse particles [ppm] | | | | 9 | 9 | 9 | 9 | 9 | 9 |
| Electrolyte solution injectability | | | | | A | A | A | A | A | A |
| Dry adhesive strength | | | | | A | A | A | A | A | B |
| Drying efficiency | | | | | A | B | A | A | A | A |
| Inhibition of nozle clogging | | | | | A | A | A | B | A | A |
| Dusting resistance | | | | | A | A | A | A | A | A |
| Low-temperature output characteristics | | | | | A | A | A | A | A | A |

| | | | | | Example 7 | Example 8 | Comparative Example 1 | Comparative Example 2 | Comparative Example 3 |
|---|---|---|---|---|---|---|---|---|---|
| Slurry for secondary battery | Particulate polymer | Structure | | | Core-shell | Core-shell | Non-core-shell | Core-shell | Core-shell |
| | | Shell | Composition [mass %] | BA | 80.7 | 80.9 | Composition: | 80.7 | 80.7 |
| | | | | MMA | 1 | 1 | BA 40 | 1 | 1 |
| | | | | ST | 18 | 18 | MAA 1 | 18 | 18 |
| | | | | AMA | 0.3 | 0.1 | ST 58 | 0.3 | 0.3 |
| | | | Tg [° C.] | | −34 | −34 | DVB 1 | −34 | −34 |
| | | Core | Composition [mass %] | ST | 70 | 88 | Tg: 60° C. | 88 | 88 |
| | | | | BA | 24 | 6 | | 6 | 6 |
| | | | | MAA | 5 | 5 | | 5 | 5 |
| | | | | EDMA | 1 | 1 | | 1 | 1 |
| | | | Tg [° C.] | | 52 | 95 | | 95 | 95 |

TABLE 1-continued

|  |  |  | | | | | |
|---|---|---|---|---|---|---|---|
|  |  | Proportion of THF-insoluble content [mass %] | 85 | 82 | 85 | 85 | 85 |
|  |  | Volume-average particle diameter [nm] | 230 | 230 | 230 | 230 | 230 |
|  |  | Degree of sweeling in electrolyte solution [factor] | 2 | 2 | 2 | 2 | 2 |
|  | Other binder | Type | ACL | ACL | ACL | ACL | ACL |
|  |  | Tg [° C.] | 5 | 5 | 5 | 5 | 5 |
|  |  | Content [parts by mass (relative to 100 parts by mass of particulate polymer)] | 14.9 | 14.9 | 14.9 | 14.9 | 14.9 |
|  | Polyhydric alcohol comound | Type | PG | PG | PG | — | PG |
|  |  | Content [parts by mass (relative to 100 parts by mass of particulate polymer)] | 100.0 | 100.0 | 100.0 | — | 500.00 |
|  |  | Content [parts by mass (relative to 100 parts by mass of water polymer)] | 12.6 | 12.6 | 12.6 | — | 125 |
|  |  | Amount of coarse particles [ppm] | 9 | 9 | 9 | 9 | 9 |
| Electrolyte solution injectability |  |  | A | A | B | B | A |
| Dry adhesive strength |  |  | B | A | D | B | A |
| Drying efficiency |  |  | A | A | A | A | D |
| Inhibition of nozzle clogging |  |  | A | A | A | D | A |
| Dusting resistance |  |  | A | A | A | A | C |
| Low-temperature output characteristics |  |  | A | B | C | A | A |

It can be seen from Table 1 that in Examples 1 to 8 in which the used slurry for a secondary battery contained a particulate polymer having a specific core-shell structure, a polyhydric alcohol compound, and water and had a content ratio of the polyhydric alcohol compound relative to the particulate polymer that was within a specific range, drying efficiency of the slurry for a secondary battery was excellent, nozzle clogging could be sufficiently inhibited even in a situation in which the slurry was supplied by an inkjet method, and an electrode and a separator could be strongly adhered via an adhesive material that was a dried product of the slurry. It can also be seen that the adhesive material had excellent dusting resistance and the secondary battery had excellent electrolyte solution injectability and low-temperature output characteristics in Example 1.

On the other hand, it can be seen from Table 1 that an electrode and a separator could not be strongly adhered via an adhesive material, and electrolyte solution injectability and low-temperature output characteristics of a secondary battery deteriorated in Comparative Example 1 in which a particulate polymer having a monophase structure (non-core-shell structure) was used instead of a particulate polymer having a core-shell structure.

Moreover, it can be seen from Table 1 that nozzle clogging could not be sufficiently inhibited in a situation in which a slurry for a secondary battery was supplied by an inkjet method and electrolyte solution injectability of a secondary battery decreased in Comparative Example 2 in which a slurry for a secondary battery that did not contain a polyhydric alcohol compound was used.

Furthermore, it can be seen from Table 1 that drying efficiency of a slurry for a secondary battery decreased and dusting resistance of an adhesive material decreased in Comparative Example 3 in which a slurry for a secondary battery having a polyhydric alcohol compound content that exceeded a specific value was used.

INDUSTRIAL APPLICABILITY

According to the present disclosure, it is possible to provide a slurry for a secondary battery with which an adhesive material can be efficiently provided at a surface of a battery member by an inkjet method or the like and that enables strong adhesion of the battery member to another battery member.

Moreover, according to the present disclosure, it is possible to provide a separator for a non-aqueous secondary battery and an electrode for a non-aqueous secondary battery that can strongly adhere to another battery member adjacent thereto and that can cause a secondary battery to display excellent low-temperature output characteristics.

Furthermore, according to the present disclosure, it is possible to provide a laminate for a non-aqueous secondary battery in which an electrode and a separator are strongly adhered and that can cause a secondary battery to display excellent low-temperature output characteristics.

Also, according to the present disclosure, it is possible to provide a non-aqueous secondary battery having excellent low-temperature output characteristics.

REFERENCE SIGNS LIST 1 conveying roller
2 pressing roller
10 negative electrode roll
11 negative electrode
20 first separator roll
30 second separator roll
21, 31 separator
40 positive electrode stocker
41 positive electrode
50 cutting machine
60A, 60B, 60C, 60D slurry feeder
61 slurry for secondary battery
100 production apparatus
200 laminate for secondary battery
300 particulate polymer
310 core portion
310S outer surface of core portion
320 shell portion

The invention claimed is:
1. A slurry for a non-aqueous secondary battery comprising a particulate polymer, a polyhydric alcohol compound, and water, wherein
the particulate polymer has a core-shell structure including a core portion and a shell portion at least partially covering an outer surface of the core portion,
a polymer of the shell portion has a glass-transition temperature of 40° C. or lower, the proportion constituted by an aromatic vinyl monomer unit in a polymer of the core portion when all repeating units (all monomer units) included in the polymer of the core portion are taken to be 100 mass % is 50 mass % or more, the polyhydric alcohol compound is at least one selected from the group consisting of 1,2-ethanediol, 1,2-propanediol, 1,3-propanediol, 1,2-butanediol, 1,3-butanediol, 1,4-butanediol, 2,3-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentane-2,4-diol, 2-ethyl-1,3-hexanediol, 1,2-octanediol, diethylene glycol, triethylene glycol, tetraethylene glycol, polyethylene glycol #200, propylene glycol, dipropylene glycol, tripropylene glycol, dibutylene glycol, glycerin, trimethylolpropane, 1,2,4-butanetriol, 1,2,6-hexanetriol, and diglycerin, not less than 10 parts by mass and not more than 400 parts by mass of the polyhydric alcohol compound is contained per 100 parts by mass of the particulate polymer.

2. The slurry for a non-aqueous secondary battery according to claim 1, wherein a polymer of the core portion has a glass-transition temperature of not lower than 10° C. and not higher than 200° C., and the polymer of the shell portion has the glass-transition temperature that is at least 10° C. lower than the glass-transition temperature of the polymer of the core portion.

3. The slurry for a non-aqueous secondary battery according to claim 1, wherein the particulate polymer has a proportion of THF-insoluble content of 80 mass % or more.

4. The slurry for a non-aqueous secondary battery according to claim 1, wherein the particulate polymer has a volume-average particle diameter of not less than 100 nm and not more than 1,000 nm.

5. The slurry for a non-aqueous secondary battery according to claim 1, wherein an amount of coarse particles having a diameter of 10 μm or more is 100 ppm or less.

6. A separator for a non-aqueous secondary battery comprising: a separator substrate; and an adhesive material provided in plurality in a dotted form on at least one surface of the separator substrate, wherein the adhesive material is a dried product of the slurry for a non-aqueous secondary battery according to claim 1.

7. An electrode for a non-aqueous secondary battery comprising: an electrode substrate; and an adhesive material provided in plurality in a dotted form on at least one surface of the electrode substrate, wherein the adhesive material is a dried product of the slurry for a non-aqueous secondary battery according to claim 1.

8. A laminate for a non-aqueous secondary battery comprising an electrode and a separator, wherein the electrode and the separator are adhered via an adhesive material provided in plurality in a dotted form, and the adhesive material is a dried product of the slurry for a non-aqueous secondary battery according to claim 1.

9. A non-aqueous secondary battery comprising the separator for a non-aqueous secondary battery according to claim 6.

10. A non-aqueous secondary battery comprising the electrode for a non-aqueous secondary battery according to claim 7.

11. A non-aqueous secondary battery comprising the laminate for a non-aqueous secondary battery according to claim 8.

* * * * *